United States Patent
Cohen

(10) Patent No.: US 8,998,112 B2
(45) Date of Patent: *Apr. 7, 2015

(54) BI-COMPONENT DRIP EMITTER

(75) Inventor: Amir Cohen, Yuvalim (IL)

(73) Assignee: Amirim Products Development & Patents Ltd., Yuvalim (IL)

( * ) Notice: Subject to any disclaimer, the term of this patent is extended or adjusted under 35 U.S.C. 154(b) by 414 days.

This patent is subject to a terminal disclaimer.

(21) Appl. No.: 13/449,572

(22) Filed: Apr. 18, 2012

(65) Prior Publication Data

US 2012/0199673 A1    Aug. 9, 2012

Related U.S. Application Data

(63) Continuation-in-part of application No. PCT/IB2010/055930, filed on Dec. 19, 2010, which is a continuation of application No. 12/697,255, filed on Jan. 31, 2010, now Pat. No. 8,317,111.

(51) Int. Cl.
*B05B 15/00* (2006.01)
*A01G 25/02* (2006.01)

(52) U.S. Cl.
CPC .................. *A01G 25/023* (2013.01)

(58) Field of Classification Search
CPC ............................. A01G 25/06; A01G 25/023
USPC .................. 239/542, 547, 107, 109, DIG. 19; 264/255, 259, 260, DIG. 64
See application file for complete search history.

(56) References Cited

U.S. PATENT DOCUMENTS

| | | | |
|---|---|---|---|
| 4,059,228 | A | 11/1977 | Werner |
| 4,209,133 | A | 6/1980 | Mehoudar |
| 4,331,293 | A | 5/1982 | Rangel-Garza |
| 4,623,094 | A | 11/1986 | Smeyers |

(Continued)

FOREIGN PATENT DOCUMENTS

| | | |
|---|---|---|
| BE | 895982 | 8/1983 |
| EP | 1884157 | 2/2008 |

(Continued)

OTHER PUBLICATIONS

International Preliminary Report on Patentability Dated Aug. 9, 2012 From the International Bureau of WIPO Re. Application No. PCT/IB2010/055930.

(Continued)

*Primary Examiner* — Davis Hwu

(57) ABSTRACT

An agricultural drip emitter optionally includes an elastomeric having a flow restriction. Flow through the emitter, when deployed inside an irrigation hose, is optionally regulated by pressure-responsive deformation of the elastomer. The flow restriction optionally includes under-tooth bypass spaces located between a base and a sequence of baffles. Some implementations also include a rigid polymer component. Optionally, a thermoset elastomer component is mechanically interlocked with the rigid component. The elastomer component and the rigid component are optionally molded as a unitary part by two component injection molding. Optionally, in the molding process, a divider initially divides the mold into two cavities. After forming the first component, the divider is optionally repositioned for forming the second component with an interface to the first component. The sequence of baffles is optionally formed by elastic stripping from an undercut mold.

31 Claims, 18 Drawing Sheets

(56) References Cited

U.S. PATENT DOCUMENTS

| | | | |
|---|---|---|---|
| 4,682,730 | A | 7/1987 | Smeyers |
| 5,183,208 | A | 2/1993 | Cohen |
| 5,203,503 | A | 4/1993 | Cohen |
| 5,279,462 | A | 1/1994 | Mehoudar |
| 5,400,973 | A | 3/1995 | Cohen |
| 5,591,293 | A * | 1/1997 | Miller et al. ............. 156/244.13 |
| 5,615,838 | A | 4/1997 | Eckstein et al. |
| 5,636,797 | A | 6/1997 | Cohen |
| 5,813,603 | A | 9/1998 | Kurtz |
| 5,829,685 | A | 11/1998 | Cohen |
| 6,027,048 | A | 2/2000 | Mehoudar |
| 6,250,571 | B1 | 6/2001 | Cohen |
| 6,886,761 | B2 | 5/2005 | Cohen |
| 8,317,111 | B2 * | 11/2012 | Cohen ........................ 239/542 |
| 2003/0057301 | A1 | 3/2003 | Cohen |
| 2011/0186652 | A1 | 8/2011 | Cohen |

FOREIGN PATENT DOCUMENTS

| | | |
|---|---|---|
| WO | WO 98/10635 | 3/1998 |
| WO | WO 2006/030419 | 3/2006 |
| WO | WO 2007/046105 | 4/2007 |
| WO | WO 2008/035332 | 3/2008 |
| WO | WO 2008/035335 | 3/2008 |

OTHER PUBLICATIONS

Office Action Dated Dec. 4, 2012 From the Israel Patent Office Re. Application No. 209748 and Its Translation Into English.

Official Action Dated Apr. 18, 2012 From the US Patent and Trademark Office Re. U.S. Appl. No. 12/697,255.

Patent Examination Report Dated May 10, 2013 From the Australian Government, IP Australia Re. Application No. 2010344331.

Translation of Notification of the Office Action Dated Jun. 18, 2013 From the State Intellectual Property Office of the People's Republic of China Re. Application No. 201080062951.1.

Translation of Search Report Dated Jun. 18, 2013 From the State Intellectual Property Office of the People's Republic of China Re. Application No. 201080062951.1.

Notification of the Office Action Dated Jun. 20, 2014 From the State Intellectual Property Office of the People's Republic of China Re. Application No. 201080062951.1 and Its Translation Into English.

Notice of Allowance Dated Jul. 20, 2012 From the US Patent and Trademark Office Re. U.S. Appl. No. 12/697,255.

International Search Report and the Written Opinion Dated Jun. 27, 2011 From the International Searching Authority Re. Application No. PCT/IB2010/055930.

Corrected Notice of Allowability Dated Oct. 25, 2012 From the US Patent and Trademark Office Re. U.S. Appl. No. 12/697,225.

Notification of the Office Action Dated Dec. 30, 2013 From the State Intellectual Property Office of the People's Republic of China Re. Application No. 201080062951.1 and Its Translation Into English.

Notification of the Office Action Dated Dec. 2, 2014 From the State Intellectual Property Office of the People's Republic of China Re. Application No. 201080062951.1.

Translation Dated Dec. 17, 2014 of Notification of the Office Action Dated Dec. 2, 2014 From The State Intellectual Property Office of the People's Republic of China Re. Application No. 201080062951.1.

* cited by examiner

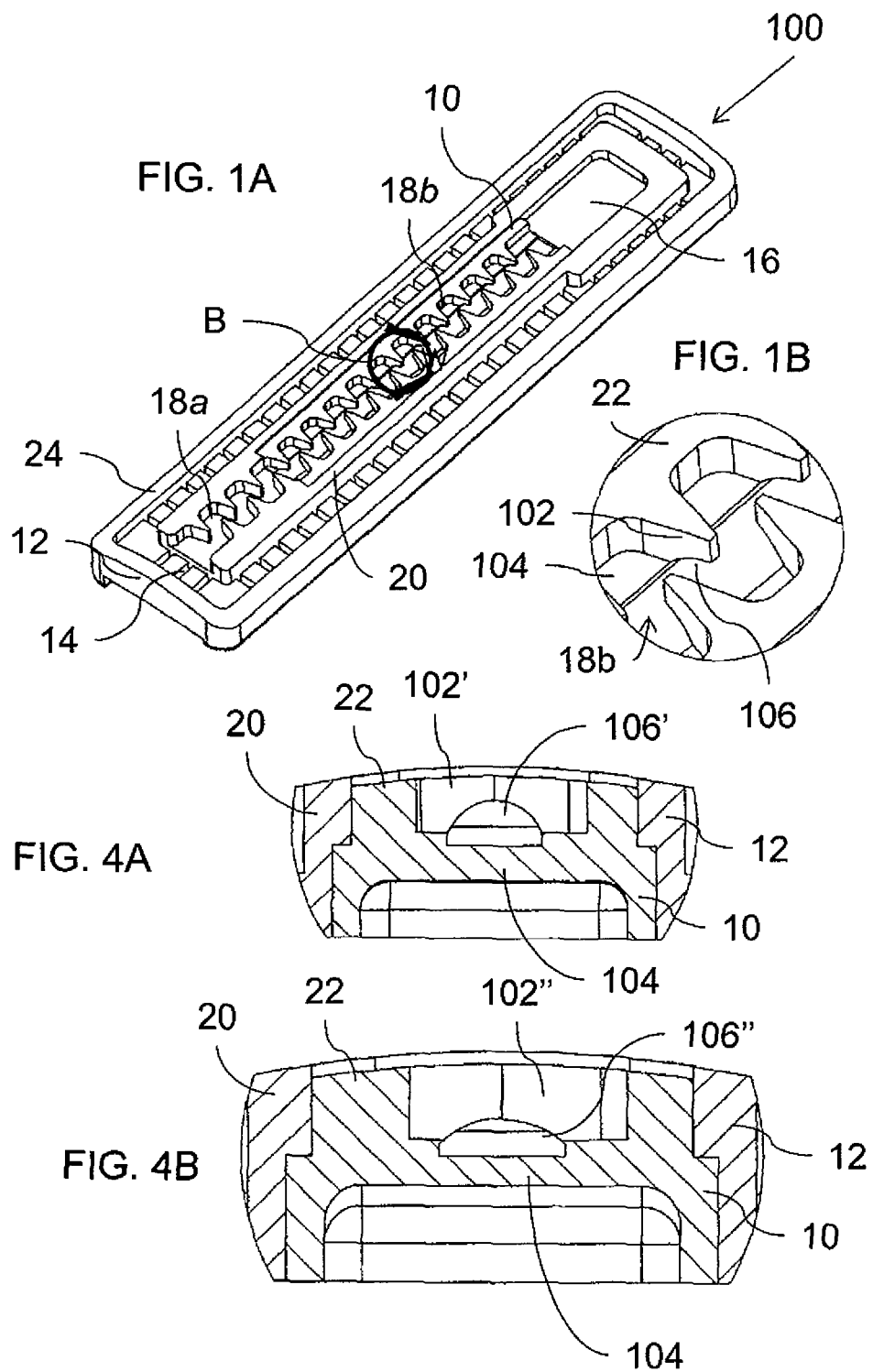

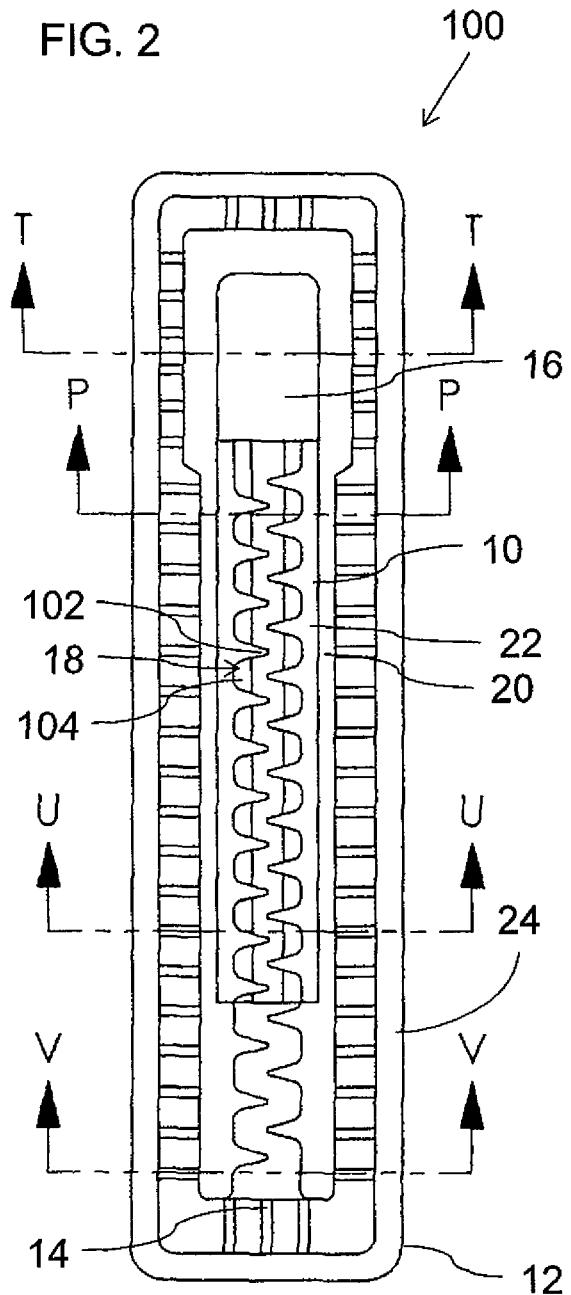

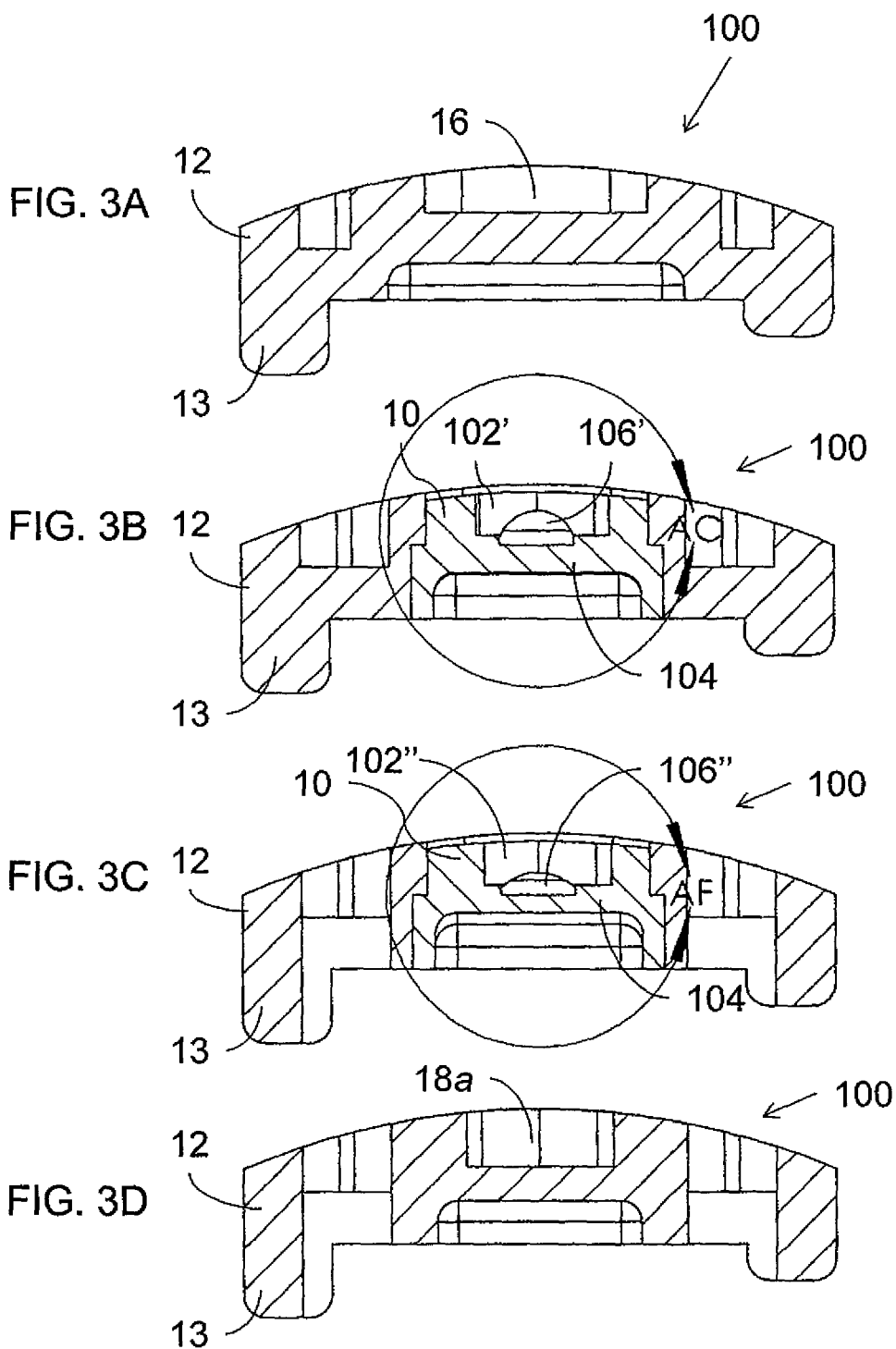

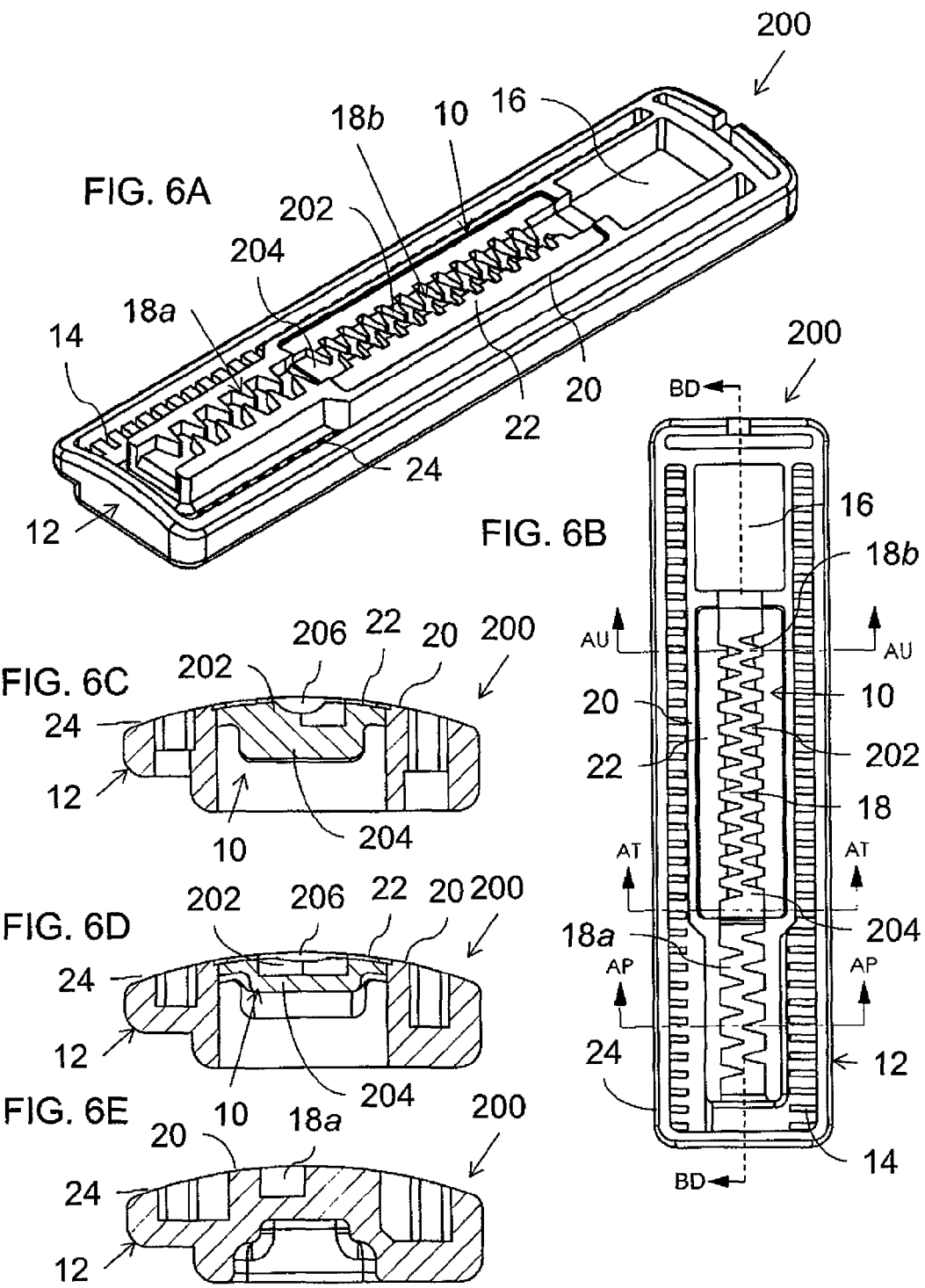

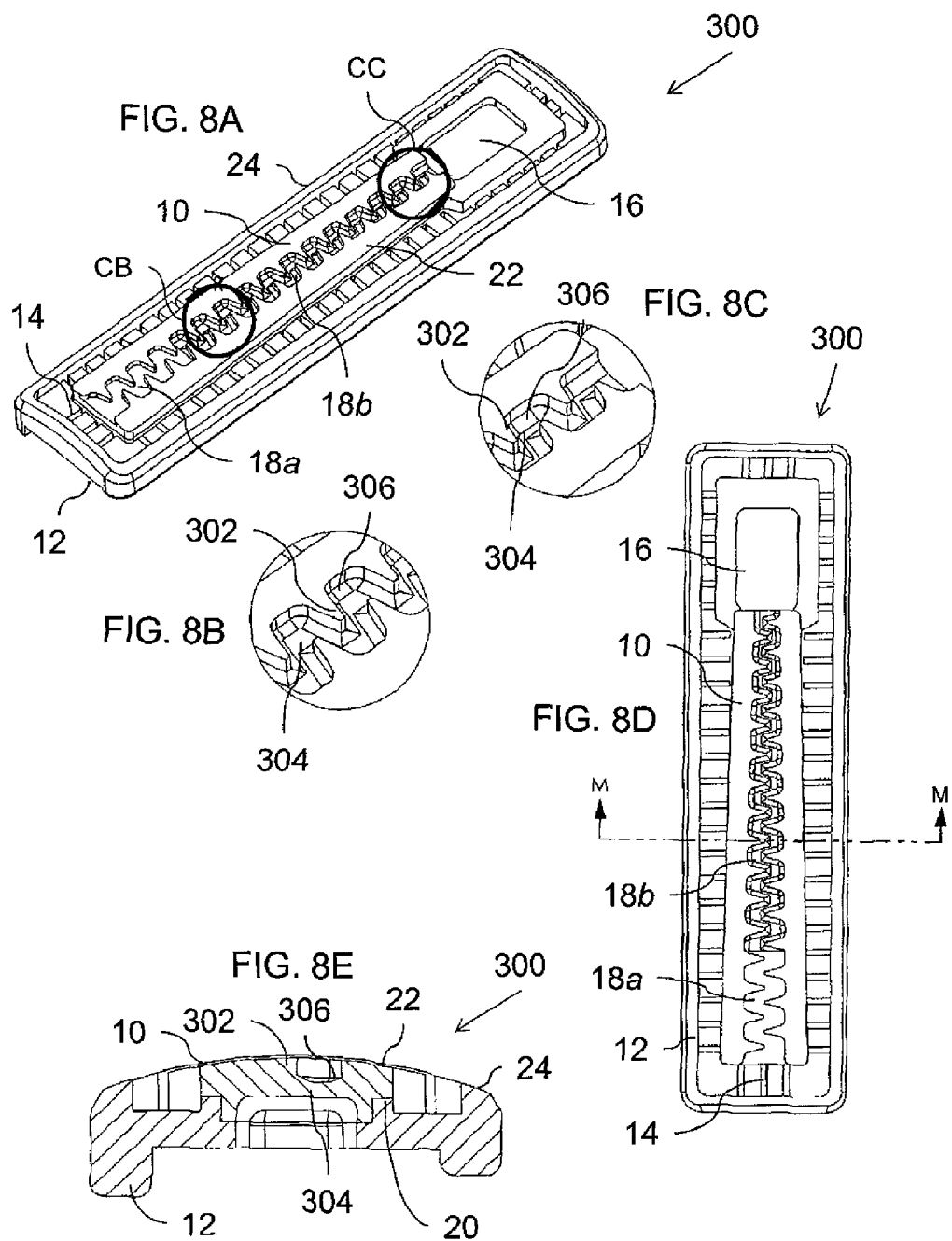

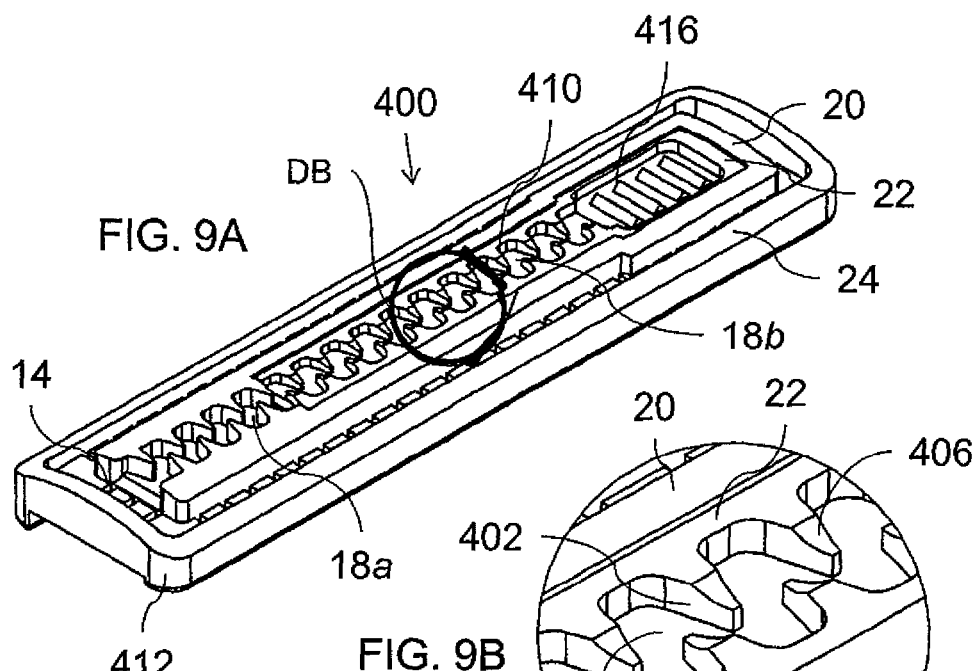
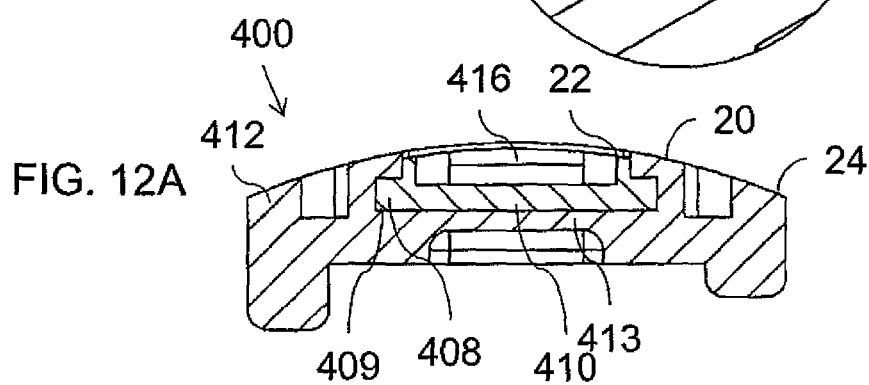
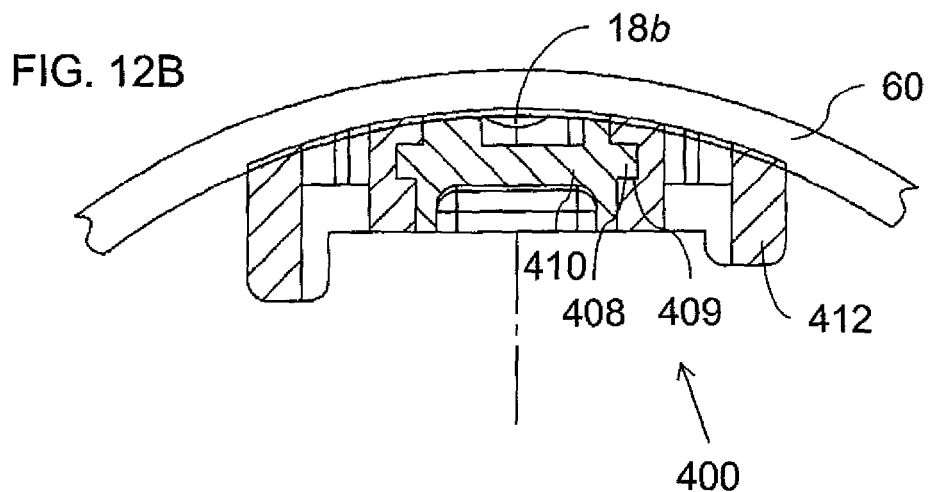

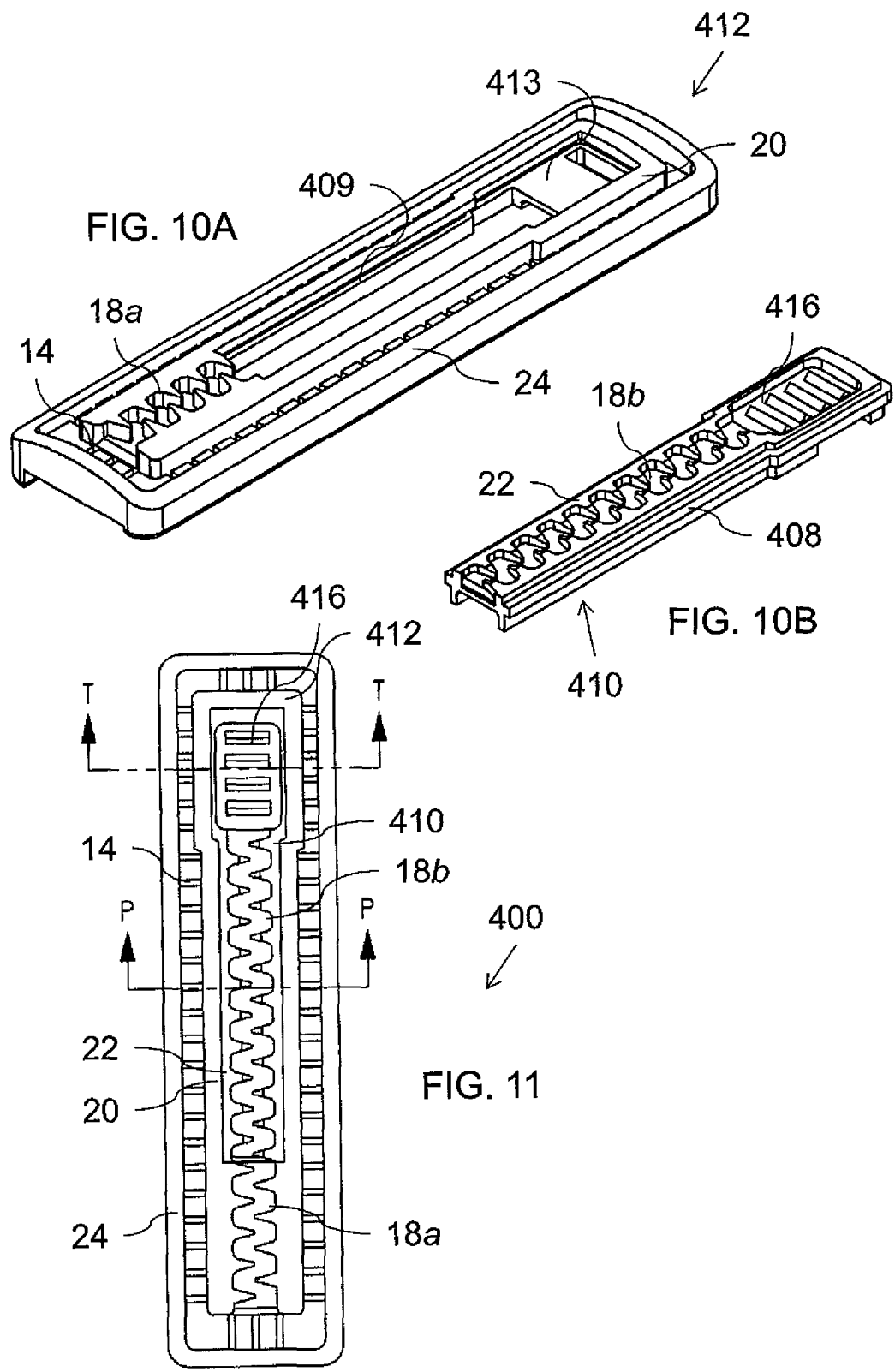

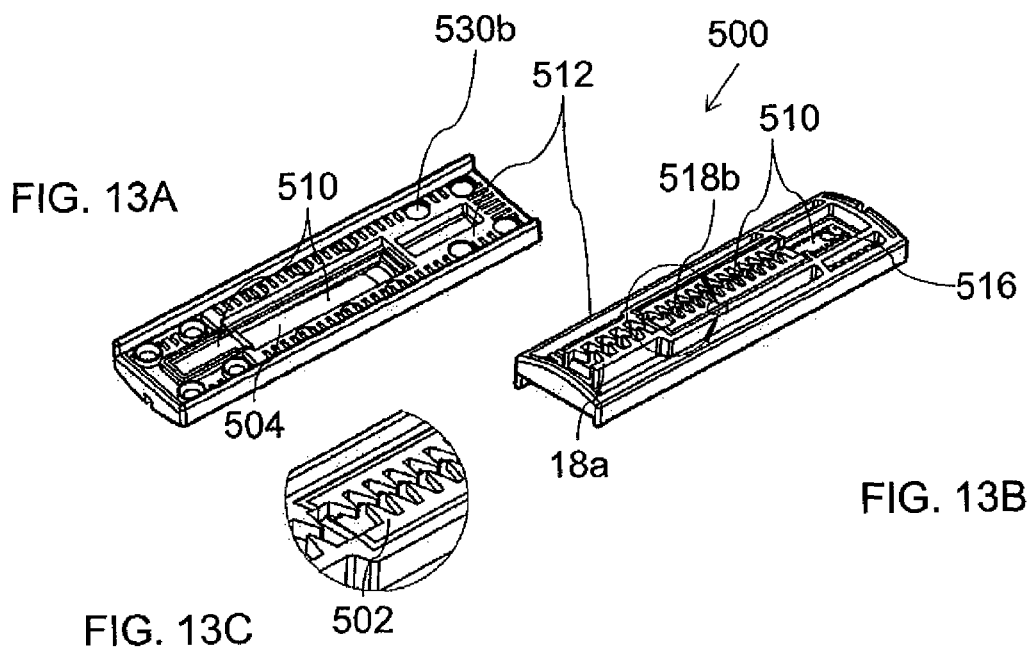

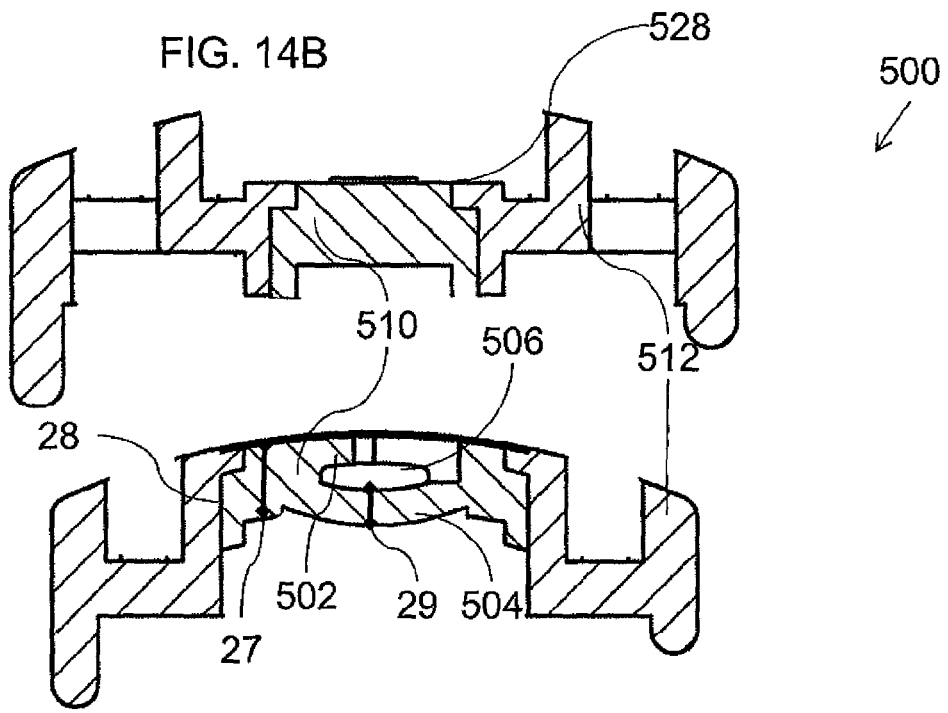
FIG. 14B
FIG. 14C
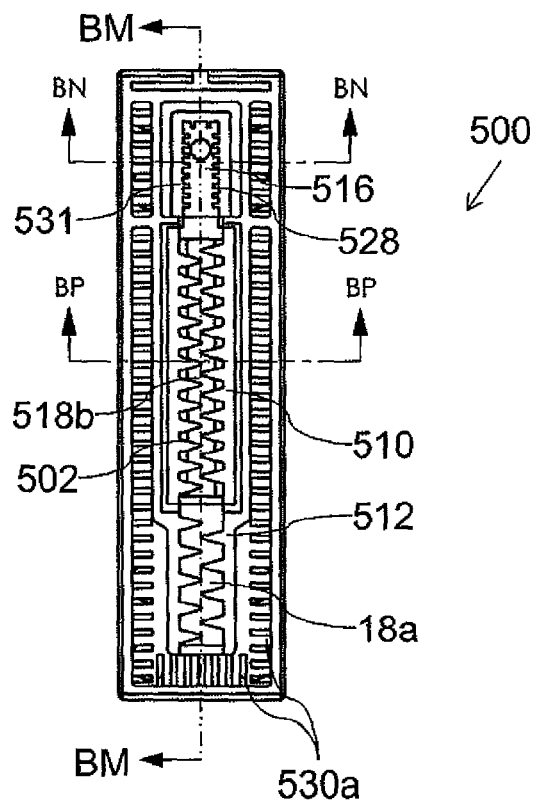
FIG. 14A

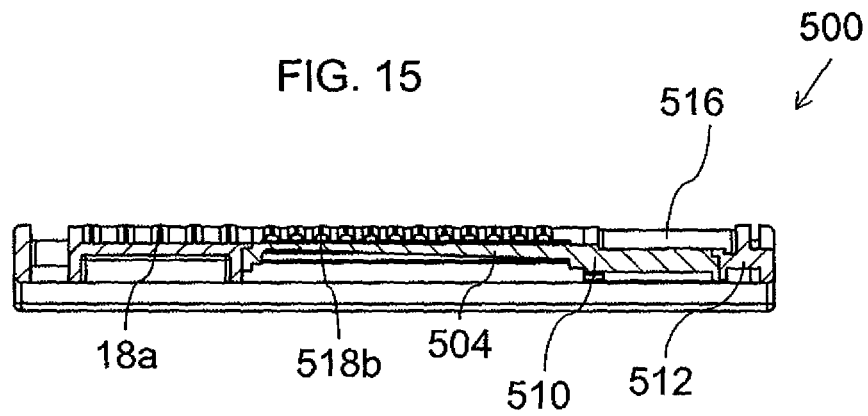

BI-COMPONENT DRIP EMITTER

RELATED APPLICATIONS

This application is a Continuation-in-Part (CIP) of PCT Patent Application No. PCT/IB2010/055930 filed on Dec. 19, 2010, which is a continuation of pending U.S. patent application Ser. No. 12/697,255 filed Jan. 31, 2010. The contents of the above applications are incorporated herein by reference in their entirety.

FIELD AND BACKGROUND OF THE INVENTION

The present invention in some embodiments thereof, relates to the field of drip emitters for attachment to an inside surface of a drip irrigation system hose and, in particular, to drip emitters formed of an elastomeric flow control component, and in some embodiments an at least partially surrounding frame component formed of a material that is relatively rigid compared the elastomeric component, and to methods of manufacturing such drip emitters.

Drip emitters for irrigation system hoses provide flow restriction to reduce flow rates to the desired level. Examples of flow restrictors include, but are not limited to, turbulent flow restrictions, laminar flow restrictions, and patterns of meandering fine flow passageways referred to as labyrinths. Labyrinth structures can also be used for pressure reduction.

In some cases, elastomeric materials are employed as part of flow restrictors and pressure reducers. Flow restrictors may be designed to provide variable flow restriction geometry which is responsive to the fluid pressure within the supply hose to at least partially compensate for flow rate variations due to changes in the pressure within the hose. An example of such an arrangement is my U.S. Pat. No. 5,400,973 in which a flat elastomeric diaphragm is deformed by pressure within the hose to sequentially close clearances across the top of a sequence of baffles forming a labyrinth.

The above approach is highly advantageous, providing pressure compensated regulation of the drip outlet flow rate.

As an alternative approach, an elastomeric material may be employed as a bulk material for production of a single piece drip emitter with pressure compensation. Examples of such devices may be found in my U.S. Pat. No. 6,886,761, which employs an elastomeric labyrinth with varying height baffles such that a pressure increase in the hose sequentially closes a bypass channel formed between the baffles and the wall of the hose. A further example is my published Patent Application No. WO 2008/035335 in which an elastomer labyrinth is formed from baffles with an upright upper wall portion and a thickened root portion which forms a sloped transition region between the upper wall portion and the base. In this case, when the fluid pressure within the irrigation hose increases, the sloped transition region becomes progressively flattened to define increased turbulence flow path geometry, thereby regulating the flow rate through the drip emitter.

Additionally, reference is made to my U.S. Pat. No. 5,203,503 which discloses a bi-component drip emitter produced by a bi-component injection molding technique. The bi-component injection molding technique perform two-stage injection with relative movement of the mold parts between stages, resulting in a unitary structure in which an elastomeric element defining a fine laminar flow restriction is implanted within a rigid polymer device. This requires a small quantity of elastomeric material to provide a variable geometry flow restriction while the rest of the drip emitter structure is formed from rigid polymer material.

Additional background art includes international published patent application WO 2006/030419 to Einav, U.S. Pat. No. 5,400,973 to Cohen, U.S. Pat. No. 5,829,685 to Cohen, U.S. Pat. No. 5,183,208 to Cohen, Israeli patent no. 139535 to Cohen, U.S. Pat. No. 5,636,797 to Cohen, and U.S. published patent application 2003/0057301 to Cohen.

SUMMARY OF THE INVENTION

According to an aspect of some embodiments of the present invention, there is provided a drip emitter for attachment to an inner surface of a wall of an irrigation hose. The emitter may include a water inlet for receiving water from the irrigation hose and a drip outlet for releasing water through an opening in the wall of the irrigation hose. The emitter may further include a fluid flow pathway from the water inlet to the drip outlet. The fluid flow pathway may include a labyrinth flow restriction. At least part of the labyrinth flow restriction may be formed in a one piece elastomeric component. The one piece elastomeric component may include a sequence of elastomeric baffles, an elastomeric base underlying the sequence of elastomeric baffles, and a plurality of under-tooth bypass spaces located between the elastomeric base and the sequence of elastomeric baffles. The one piece elastomeric component may be configured such that, when the drip emitter may be attached to the inner surface of the irrigation hose, the elastomeric base may be responsive to increasing fluid pressure within the irrigation hose to progressively contact more baffles of the sequence of elastomeric baffles. Contact between the elastomeric base and the elastomeric baffles may progressively close the respective under-tooth bypass spaces, thereby regulating a flow rate through the drip emitter.

According to some embodiments of the invention, the drip emitter may further include a relatively rigid polymer component.

According to some embodiments of the invention, a minimum thickness of the base may be less than a height of an interface between the one piece elastomeric component and the relatively rigid polymer component.

According to some embodiments of the invention, the relatively rigid polymer component may extend around the elastomeric component on at least three sides.

According to some embodiments of the invention, the emitter may further include a hose interface including contact surfaces for interacting with the inner surface of the wall of the hose. The hose interface may include a frame formed by the relatively rigid polymer component extending around the elastomeric component on at least three sides. The hose interface may further include a margin provided by the elastomeric component for abutting the inner surface of the wall of the hose so as to delimit the part of the flow restriction formed within the elastomer component.

According to some embodiments of the invention, the frame may project beyond the margin such that, when the frame is welded to the inner surface of the wall of the hose, the frame penetrates into the wall of the hose to a greater degree than the margin.

According to some embodiments of the invention, the elastomeric component and the relatively rigid polymer component may be integrally formed together.

According to some embodiments of the invention, the elastomeric component and the relatively rigid polymer component may be formed by bi-component injection molding.

According to some embodiments of the invention, the elastomeric component and the relatively rigid polymer component may be formed with complementary interlocking features. The complementary interlocking features may be formed so as to mechanically retain the elastomeric component engaged with the relatively rigid polymer component.

According to some embodiments of the invention, the elastomeric component may be formed from a thermosetting elastomer.

According to an aspect of some embodiments of the present invention, there is provided an irrigation system. The irrigation system may include an irrigation hose and a plurality of drip emitters attached to an inner surface of the irrigation hose at intervals along a length of the irrigation hose.

According to an aspect of some embodiments of the present invention, there is provided a drip emitter for attachment to an inner surface of a wall of an irrigation hose around less than half of the periphery of the irrigation hose. The drip emitter may include a thermoset elastomeric component surrounded on at least three sides by a relatively rigid polymer component. The drip emitter may further include a water inlet for receiving water from the irrigation hose and a drip outlet for releasing water through an opening in the wall of the irrigation hose. The drip emitter may further include a fluid flow pathway from the water inlet to the drip outlet. The fluid flow pathway may include a flow restriction. At least part of the flow restriction may be a variable geometry flow restriction formed by the thermoset elastomeric component. The thermoset elastomeric component and the relatively rigid polymer component may be formed by bi-component injection molding. The thermoset elastomeric component may be configured such that, when the drip emitter is attached to the inner surface of the irrigation hose, the thermoset elastomeric component may be responsive to a change in a fluid pressure within the irrigation hose to modify a geometry of the variable geometry flow restriction so as to regulate a flow rate through the drip emitter. The thermoset elastomeric component and the relatively rigid polymer component may be formed with complementary interlocking features such that, when the drip emitter is attached to the inner surface of the irrigation hose, the thermoset elastomeric component may be mechanically retained in engagement with the relatively rigid polymer component.

According to some embodiments of the invention, the water inlet may be formed in the elastomeric component.

According to some embodiments of the invention, the drip outlet may be formed in the elastomeric component.

According to some embodiments of the invention, the complementary interlocking features may be configured such that the thermoset elastomeric component may be mechanically retained against disengagement from the relatively rigid polymer component in any direction.

According to some embodiments of the invention, the thermoset elastomeric component may include a sealing margin deployed to seal against the inner surface of the irrigation hose and defining the drip outlet.

According to some embodiments of the invention, the emitter may further include a hose interface. The hose interface may include contact surfaces for interacting with the inner surface of the wall of the hose. The hose interface may further include a frame formed by the relatively rigid polymer component extending around the elastomeric component on at least three sides, and a margin provided by the elastomeric component for abutting the inner surface of the wall of the hose so as to delimit the variable geometry flow restriction.

According to some embodiments of the invention, the frame may project beyond the margin such that, when the frame is welded to the inner surface of the wall of the hose, the frame may penetrate into the wall of the hose to a greater degree than the margin.

According to some embodiments of the invention, the flow restriction may be implemented as a labyrinth.

According to some embodiments of the invention, at least part of the labyrinth may include a sequence of baffles and a base. The sequence of baffles and the base may be integrally formed as part of the thermoset elastomeric component.

According to some embodiments of the invention, the thermoset elastomeric component may further include a plurality of under-tooth bypass spaces. The under-tooth bypass spaces may pass between the base and the sequence of baffles. The base may be exposed to the fluid pressure within the irrigation hose such that increased fluid pressure within the irrigation hose may causes progressive closing of the under-tooth bypass spaces, thereby regulating the flow rate through the drip emitter.

According to some embodiments of the invention, the thermoset elastomeric component may further include a plurality of over-tooth bypass clearances formed along the top edges of the sequence of baffles. When the emitter is attached to the inner surface of the irrigation hose, the over-tooth bypass clearances may allow a flow of water between the sequence of baffles and the inner surface of the wall of the hose. The base may be exposed to the fluid pressure within the irrigation hose such that increased fluid pressure within the irrigation hose may cause progressive closing of the bypass clearances, thereby regulating the flow rate through the drip emitter.

According to some embodiments of the invention, an underside of the base may be exposed to the fluid pressure within the irrigation hose. The baffles of the variable geometry labyrinth may have an upright upper wall portion and a thickened root portion which forms a sloped transition region between the upper wall portion and the base. When the fluid pressure within the irrigation hose increases, the sloped transition region may become progressively flattened to define increased turbulence flow path geometry, thereby regulating the flow rate through the drip emitter.

According to an aspect of some embodiments of the present invention, there is provided a method of manufacturing a drip emitter. The drip emitter may include two components, a relatively rigid frame component and an elastomeric flow control component. The two components may be molded as a unitary structure. The method may include initially positioning a movable divider to partition a hollow of the mold into at least two cavities. The two cavities may include an inner cavity for forming the elastomeric flow control component and an outer cavity for forming the frame. The method may further include injecting a first material into a first of the at least two cavities to form a first of the two components. The method may further include reconfiguring the mold by repositioning the movable divider to open an interface between the first cavity and a second cavity of the at least two cavities. The method may further include injecting a second material into the second cavity to form a single integral structure including the first material and the second material.

According to an aspect of some embodiments of the present invention, the first cavity may be the outer cavity and the second cavity may be the inner cavity and the second material may be an elastomeric polymer.

According to an aspect of some embodiments of the present invention, the first material may be an elastomeric polymer and the first cavity may be the inner cavity and the second cavity may be the outer cavity.

According to an aspect of some embodiments of the present invention, the mold may include a first section and a second section. The second section may include the first cavity and the second cavity. The first section may include an undercut for forming at least one baffle and a projection for forming a bypass space.

According to an aspect of some embodiments of the present invention, the undercut may be configured to communicate with the hollow of the first section and the projection may intervene between a portion of the undercut and the hollow of the first section.

According to an aspect of some embodiments of the present invention, the undercut may be in communication with the inner cavity According to an aspect of some embodiments of the present invention, the initially positioning of the divider may include abutting the divider against the first section. The repositioning of the divider may include distancing the divider from the first section.

According to an aspect of some embodiments of the present invention, the method may further include stripping the baffle from the undercut by elastic deformation of the baffle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A is an isometric view of a first embodiment of a drip emitter, constructed and operative according to an aspect of the teachings of the present invention, for attachment to an inner surface of a wall of an irrigation hose;

FIG. 1B is an enlarged view of the region of FIG. 1A marked by circle "B";

FIG. 2 is a top view of the drip emitter of FIG. 1A;

FIG. 3A is a cross-sectional view taken along the line T-T of FIG. 2;

FIG. 3B is a cross-sectional view taken along the line P-P of FIG. 2;

FIG. 3C is a cross-sectional view taken along the line U-U of FIG. 2;

FIG. 3D is a cross-sectional view taken along the line V-V of FIG. 2;

FIG. 4A is an enlarged view of the region of FIG. 3B marked by circle "AC";

FIG. 4B is an enlarged view of the region of FIG. 3C marked by circle "AF";

FIG. 6A is an isometric view of a second embodiment of a drip emitter, constructed and operative according to an aspect of the teachings of the present invention, for attachment to an inner surface of a wall of an irrigation hose;

FIG. 6B is a top view of the drip emitter of FIG. 6A;

FIG. 6C is a cross-sectional view taken along the line AU-AU of FIG. 6B;

FIG. 6D is a cross-sectional view taken along the line AT-AT of FIG. 6B;

FIG. 6E is a cross-sectional view taken along the line AP-AP of FIG. 6B;

FIG. 8A is an isometric view of a third embodiment of a drip emitter, constructed and operative according to an aspect of the teachings of the present invention, for attachment to an inner surface of a wall of an irrigation hose;

FIG. 8B is an enlarged view of the region of FIG. 8A marked by circle "CB";

FIG. 8C is an enlarged view of the region of FIG. 8A marked by circle "CC";

FIG. 8D is a top view of the drip emitter of FIG. 8A;

FIG. 8E is a cross-sectional view taken along the line M-M of FIG. 8D;

FIG. 9A is an isometric view of a fourth embodiment of a drip emitter, constructed and operative according to an aspect of the teachings of the present invention, for attachment to an inner surface of a wall of an irrigation hose;

FIG. 9B is an enlarged view of the region of FIG. 9A marked by circle "DB";

FIGS. 10A and 10B are isometric views of a rigid polymer component and a silicone component, respectively, from the drip emitter of FIG. 9A;

FIG. 11 is a top view of the drip emitter of FIG. 9A;

FIG. 12A is a cross-sectional view taken along the line T-T of FIG. 11;

FIG. 12B is a cross-sectional view taken along the line P-P of FIG. 11, but additionally showing the drip emitter attached to part of an irrigation hose;

FIGS. 13A and 13B illustrate isometric top and bottoms views respectively of a variation of the embodiment of FIGS. 1A-5D;

FIG. 13C is an expanded view of the region in FIG. 13B marked C;

FIG. 14A is a top view of the embodiment of FIG. 13A;

FIGS. 14B and 14C are cross sectional views taken along lines BN and BP respectively of FIG. 14A;

FIG. 15 is a cross sectional view taken along line BM of FIG. 14A;

Throughout the drawings, the same reference signs are used to designate like or essentially similar parts.

DESCRIPTION OF SPECIFIC EMBODIMENTS OF THE INVENTION

Figure 5A:
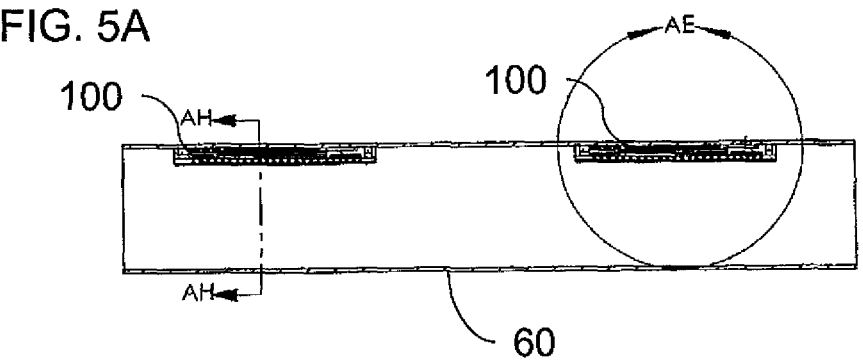
FIG. 5A is a longitudinal cross-sectional view taken through an irrigation hose employing a plurality of the drip emitters of FIG. 1A.

The present invention in some embodiments thereof, relates to the field of drip emitters and, more particularly, but not exclusively, to drip emitters having a flow control component formed of elastomer, and optionally an at least partially surrounding frame formed of a material that is relatively rigid compared the elastomeric component, and to methods of manufacturing such drip emitters.

Overview of Some Embodiments

Some embodiments of the invention pertain to a drip emitter may be configured such that, when it is attached to an inner surface of an irrigation hose, the emitter provides an inlet for receiving water from the irrigation hose, a drip outlet for releasing water through an opening in the wall of the irrigation hose and an intermediate flow control pathway.

An aspect of some embodiments of the current invention is a flow control component formed of a single piece of elastomer. Optionally, the elastomeric flow control component may be responsive to pressure variations in the hose to regulate the flow of water from the inlet to the outlet.

An aspect of some embodiments of the current invention is a single piece elastomeric flow control component including a labyrinth flow restriction arrangement formed by a sequence of baffles, a base underlying the sequence of baffles, and bypass spaces between the base and the baffles. Optionally the base may be responsive to increased fluid pressure within the irrigation hose to progressively vary the configuration of the bypass spaces, thereby regulating the flow rate.

An aspect of some embodiments of the current invention is an agricultural drip emitter formed as a unitary structure of the elastomeric flow control component and a second component. Optionally the second component may be more rigid than the elastomeric flow control component. Optionally the second component may form a frame at least partially surrounding the elastomeric flow control component.

An aspect of some embodiments of the current invention is a single piece elastomeric component that provides an inlet for receiving water from the irrigation hose, an outlet for releasing water through an opening in the wall of the irrigation hose, and a fluid flow pathway between the inlet and the outlet when the drip emitter is attached to an inside surface of an irrigation hose. Optionally, the emitter may also include a relatively rigid component.

An aspect of some embodiments of the current invention is elements that cooperate to mechanically interlock the elastomeric flow component and the relatively rigid component together.

An aspect of some embodiments of the current invention is a bi-component injection mold including a movable divider for molding an unitary emitter formed of an elastomeric component and a relatively rigid polymer frame component. Optionally, the movable divider may be positionable to divide the hollow portion of the mold into a plurality of cavities. Optionally, the divider may also be positionable to provide an interface between at least two of the cavities.

An aspect of some embodiments of the current invention is forming elastomeric teeth of a labyrinth by complementary undercuts on a mold. Optionally, the emitter is unmolded by reversibly displacing the labyrinth teeth.

By way of introduction, various aspects of the present invention will be illustrated herein with reference non-limiting embodiments described below. Specifically, FIGS. 1A-5D illustrate a first exemplary embodiment of the present invention in which a drip emitter includes an elastomeric labyrinth with variable geometry under-tooth bypass spaces. FIGS. 6A-7C illustrate a second exemplary embodiment of the present invention in which a bi-component drip emitter includes an elastomeric labyrinth with a variable geometry including over-tooth bypass clearances. FIGS. 8A-8D illustrate a third exemplary embodiment of the present invention in which a bi-component drip emitter includes an elastomeric labyrinth employing baffles with a thickened root portion which forms a sloped transition region between an upright upper wall portion and the base. Finally, FIGS. 9A-12B illustrate, for example, a further aspect of the present invention in which a bi-component drip emitter is implemented with a thermoset elastomer such as silicone as the elastomeric component. FIGS. 13A through 15, illustrate another exemplary embodiment having optional features to facilitate molding. FIGS. 16A through 18B illustrate an exemplary method of molding a bi-component drip emitter.

Before addressing the exemplary embodiments in detail, it should be understood in generic terms that embodiments of the present invention relate to a bi-component drip emitter (denoted 100, 200, 300, 400, or 500 in the exemplary embodiments described below) of a type affixed by attachment to the inner surface of a drip irrigation system hose, preferably around less than half the periphery of the irrigation hose and at spaced locations along the hose. In general terms, introducing uniform reference numerals which will be used for similar elements throughout the description and drawings, the drip emitter includes an elastomeric component 10 which is molded within a rigid polymer component 12. The drip emitter is configured such that, when welded to the inner surface of an irrigation hose 60, it defines a water inlet, shown here as a set of slits 14, for receiving water from the irrigation hose, a drip outlet 16 for releasing water through a hole 62 in the wall of the irrigation hose, and a fluid flow pathway from the water inlet to the drip outlet. The fluid flow pathway includes a flow restriction, typically in the form of a labyrinth flow restriction, and typically includes a constant geometry flow restriction (for example flow path 18a) in addition to a variable geometry flow restriction (for example flow path 18b). At least the latter is formed by the elastomeric component 10, as will be detailed in the context of each embodiment. A region of the elastomeric component 10 is exposed to a fluid pressure within the irrigation hose and configured such that variation of fluid pressure within the irrigation hose affects the variable geometry flow restriction so as to regulate a flow rate through the drip emitter.

According to an aspect of the present invention, the drip emitters are produced by bi-component molding techniques. Various implementations of technology suitable for implementing the present invention, and corresponding injection molding devices, are commercially available from a number of sources, including ARBURG GmbH (DE) and BRAUNFORM GmbH (DE).

DEFINITIONS

Before addressing the specific exemplary embodiments of the present invention in detail, it will be useful to define certain terminology as used herein in the description and claims.

Firstly, the drip emitters of the present invention are described as intended to be affixed to an irrigation hose, for example, by welding to the inner surface of the wall of a polymer irrigation hose around less than half the periphery of the irrigation hose and at spaced locations along the hose.

The phrase "spaced locations along the hose" is used herein to denote a self-contained drip emitter for localized attachment to the drip irrigation hose, in contrast to continuous strip type drip emitters which are formed by extrusion techniques.

The term "irrigation hose" is used herein generically to refer to any and all types of irrigation hoses, whether seamless or formed with a welded seam, and independent of the structural material, the wall thickness or the degree of flexibility of the hose.

The phrase "around less than half periphery of the irrigation hose" is used herein to denote a drip emitter which is attached to one side of the inner periphery of the irrigation hose, in contrast to cylindrical inserts. It should be noted however that many aspects of the present invention are applicable also to cylindrical inserts.

The term "welding" is used to refer to a bonding technique that may be used to attach the drip emitter to the wall of the irrigation hose, and typically refers to a bond generated when the drip emitter is pressed against the wall while the wall is still hot and soft during the extrusion process. This bond typically results in a part of the rigid polymer component, and often also part of the elastomeric component of the drip emitter being slightly embedded into the hose wall and forming a strong bond with the hose material, as will be discussed further below. It should be noted, however, that the term "welding" is used here in a broad sense, and does not exclude the possibility of other and/or additional physical or chemical conditions or processes being performed to enhance the boding of the parts.

Reference will be made to features of the drip emitter which define an inlet, an outlet and an intermediate flow path. It should be appreciated that when the drip emitter is attached to an inner surface of an irrigation hose, the surface of the irrigation hose wall may optionally serve as a closing surface that provides a functional part of the various flow-path-defining features of the drip emitter. Nevertheless, the various flow-path features of the drip emitter may be considered fully defined by the structure of the drip emitter alone, taking into consideration that the spatial relation to the closing surface of the irrigation hose is also defined by features of the emitter itself, without requiring any particular structure or features in the irrigation hose.

The inlet is therefore defined for example by one or more openings which, after bonding of the drip emitter to the inner surface of an irrigation hose, define a flow path from the interior of the hose into the drip emitter. Most preferably, a plurality of slits or other small openings are used, thereby providing a filtering function, as will be discussed below.

The outlet is configured to allow release of water through a hole in the wall of the irrigation hose. In the examples described below, the outlet is a flat recess facing the hose wall providing a piercing region within which a hole is formed through the hose wall. Alternative outlet configurations, such as an outlet conduit projecting through the hose wall, also fall within the scope of the invention.

The terms "labyrinth" and "labyrinth arrangement" are used to refer to any flow restriction which is implemented as along a flow path, and most typically, having a meandering or zigzag flow pattern. For example, flow may be impeded by barriers between sections or legs of the path, referred to as "baffles" or "teeth". Baffles may be of any shape. In a preferred case, the baffles are deployed as "interlocking" or "interleaved", i.e., projecting inwards alternately from opposing sides of a channel in an interlocking pattern, thereby defining a to-and-fro labyrinth flow path.

Reference is made to the flow path having a "spatially varying geometry". "Spatially varying geometry" refers to changes in the labyrinth that occur along the length of the flow path. Typically the changes may be in the configuration of the baffles along the length of the flow path. Typically, the changes will be apparent when the drip emitter is at rest i.e. not actually in use. Alternatively or additionally, in some cases, changes may be in the thickness of the base of the flow path or in the flexibility of the material of the flow path. These differences may not be apparent when the emitter is at rest.

Reference is made to the flow path having a "variable geometry". The geometry of a "variable geometry" flow path may change over time. For example the geometry may change in response to water pressure variation in the hose. For example, geometry changes may increase or decrease flow resistance through the flow path. Optionally, the changes in flow resistance may "regulate" the drip emitter flow. For example, flow regulation may provide a "compensated" drip emitter. In this context, the terms "regulate" and "compensate" are used to refer to responsive properties which, for example, may at least partially compensate for variations in flow rate which would otherwise result from variations of pressure within the irrigation hose.

In some embodiments, a flow path may be both "spatially variable" and have a "variable geometry". This may permit the flow path configuration to respond differently along its length.

Reference is made in some embodiments to "bypass spaces" or "bypass clearances" which are spaces or clearances which allow some or all of the flow through a labyrinth to bypass a flow restriction, for example, one or more baffles. Optionally, these spaces and clearances may be arranged to progressively close and open. Optionally, the opening and closing may be a function of the pressure within the irrigation hose. For example, closing and opening clearances may modify the properties of the flow restriction. For example, the progressive property may be due at least in part to the spatially varying geometry. The spaces and clearances are typically defined in an unstressed state of the elastomeric element of the drip emitter. The spaces and clearances may optionally vary in dimensions in response to increased pressure within the irrigation hose.

The bi-component drip emitters according to an aspect of some embodiments the present invention employ an "elastomeric" flow control component. The term "elastomeric" is used herein in the description and claims to refer to any elastomeric material with sufficient flexibility to provide variable geometry flow regulation as taught, for example, in the context of the various embodiments below. The elastic behavior may be roughly repeatable. Preferred examples of suitable elastomeric materials include, but are not limited to, thermoplastic elastomers (TPE) such as SANTOPRENE® and/or thermoplastic polyurethane and thermosetting polymers such as silicone and/or nitrile rubber (NBR).

The term "rigid polymer" is used herein to refer to any structural polymer suitable for forming the bulk structure and/or frame of the drip emitter of the present invention, and which is less flexible than the elastomeric material forming the flow control component. Preferred but non-limiting examples of suitable rigid polymers include polyethylene (PE) and polypropylene (PP).

The term water is typically used herein to refer to any irrigation fluid. Often irrigation fluids contain various agricultural materials along with or in place of water. For example, the term water may include irrigation fluids containing various minerals and/or pesticides and/or fertilizers.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Example of Under-Tooth Bypass Clearances

Referring now to the drawings, FIGS. 1A-5D show an exemplary drip emitter, generally designated 100. Emitter 100 includes an elastomeric flow control component including a spatially varying geometry labyrinth arrangement with under-tooth bypass clearances.

Drip emitter 100 is intended for attachment to an inner surface of a wall of an irrigation hose around less than half of the periphery of the irrigation hose at spaced apart locations along the irrigation hose, as illustrated, for example, in FIGS. 5A-5D.

Drip emitter 100 includes an elastomeric flow control component 10 and a rigid polymer component 12, forming a frame that at least partially surrounds flow control component 10. Optionally, drip emitter 100 is configured such that, when welded to the inner surface of the irrigation hose, it defines a water inlet 14 for receiving water from the irrigation hose, a drip outlet 16 for releasing water through the wall of the irrigation hose, and a fluid flow pathway from the water inlet to the drip outlet.

In the exemplary embodiment illustrated here, the fluid flow pathway includes a labyrinth arrangement formed by a sequence of baffles 102 and a base 104. A first part of the flow path 18a is a labyrinth with a substantially constant geometry while a second part of the flow path 18b has a variable geometry, as detailed, by way of example, below. At least the variable part of the flow path 18b, with its corresponding part of the sequence of baffles 102 and base 104, is integrally formed as part of elastomeric component 10.

An aspect of some embodiments of the present invention, illustrated by way of example here, is that elastomeric flow component 10 is formed of a single piece of elastomer. Optionally, component 10 includes a plurality of under-tooth bypass spaces 106 passing between base 104 and the sequence of baffles 102. Drip emitter 100 is configured so that, when deployed, for example in an irrigation hose, the underside of base 104 is exposed to the fluid pressure within the irrigation hose. The form of under-tooth bypass spaces 106 and base 104 are chosen such that progressive increasing of fluid pressure within the irrigation hose progressively closes more of under-tooth bypass spaces 106, thereby regulating the flow rate through drip emitter 100.

In the preferred example illustrated in FIGS. 1A-5D, progressive closure of under-tooth bypass spaces 106 is enhanced by the spatial variation of the cross-sectional size and shape of the bypass spaces along the length of the labyrinth.

For example, near the begging of flow path 18b bypass spaces close under moderate pressure. This is illustrated, for example in the cross-sectional view of FIG. 3C and the enlargement of FIG. 4B taken near the beginning of the spatially varying, variable geometry flow path 18b (along line U-U in FIG. 2). Optionally, space 106" is relatively shallow and flat, thereby facilitating closure of the bypass spaces in this region. Moderate pressure (for example greater than a threshold of between 0.5 and 2 bar and preferably for example greater than a threshold of between 1 and 2 bar) causes base 104 to deflect into the shallow space 106" contacting the bottom surface of the respective tooth 102".

In the example, in contrast to the beginning of flow path 18b, near the end of flow path 18b, closing bypass spaces require greater pressure. This is illustrated, for example, in the cross-sectional view of FIG. 3B, and the enlarged cross-sectional view of FIG. 4A taken (along line P-P in FIG. 2) near the end (outlet 16) of the spatially varying variable geometry labyrinth (flow path 18b). Optionally, there, under-tooth bypass space 106' is deeper and has steeper sides, making it more resistant to complete closure until pressures towards the upper end of the working range of pressures are applied to the underside of base 104. High pressure (for example greater than a threshold of between 2 and 3 bar) causes base 104 to deflect into the space 106' contacting the bottom surface of the respective tooth 102' closing space 106'.

It will be noted that the graduated shape and size of under-tooth bypass spaces 106 illustrated, for example, here is only one of many possible implementations to achieve progressive closing of the bypass spaces. For example, alternative implementations (not shown) may employ a progressively changing bypass space shape without significant variation in dimensions, or varying dimensions without significant change of shape. Additionally, or alternatively, variations in the thickness or structure of base 104 may be used to provide a graduated response to applied pressure along the length of the variable geometry flow path 18b. Additionally or alternatively, variations in the flow path may be irregular along the length of the flow path. For example, sections having shallow and deep bypass spaces may be positioned in an alternating manner along the flow path (one section of shallow spaces followed by a section of deep spaces follow by a section of shallow spaces etc.).

Under-tooth bypass spaces 106 are described as being between baffles 102 and base 104 in the sense that base 104 and baffles 102 face each other across the spaces. The spaces may be formed by borrowing from the thickness of base 104 or from the height of baffles 102, or both, and may occupy any proportion of the width of the labyrinth flow path. Most preferably, the bypass spaces are aligned to facilitate laminar flow through a sequence of the spaces, in parallel to the flow through the labyrinth.

As the number of under-tooth bypass spaces 106 that are partially or completely closed increases, a greater proportion of the fluid flow over a greater length of the flow path is forced to follow a turbulent path around baffles 102, thereby progressively increasing the impedance to flow and at least partially compensating for increased pressure within the irrigation hose to keep the outlet drip rate closer to the design drip rate than would be achieved without such regulation.

The use of under-tooth bypass spaces 106, for example as described herein, has additional advantages in that regulation occurs, for example, between two surfaces which are both provided by the single elastomeric component 10 (i.e., the underside of baffles 102 and the upper surface of base 104). In some cases, it may be possible to define relatively precise spatial relations in a single piece of elastomer, for example, by an injection molding production process. In some embodiments this may enhance reliability and repeatability of the flow regulation properties.

In some embodiments, the use of elastomeric material for baffles 102 in the region of under-tooth bypass spaces 106 also facilitates the production process for this structure, allowing the mold feature that extends under baffles 102 to define the bypass spaces to be released after molding by momentary resilient flexing of baffles 102 without causing damage to the baffles.

A further aspect of certain exemplary embodiments of the present invention, relates to a hose interface including contact surfaces for interacting with the inner surface of the wall of the irrigation hose. For example, rigid polymer component 12 preferably provides a frame 20 extending around elastomeric component 10 on at least three sides. Additionally, elastomeric component 10 preferably provides margins 22 for abutting the inner surface of the wall of the hose so as to limit welding depth of elastomeric component 10 while providing a seal along the edges of the variable flow restriction. In the exemplary case illustrated here, margins 22 are contiguous with baffles 102 and form a continuous strip running along two sides of frame 20.

Figure 5B:
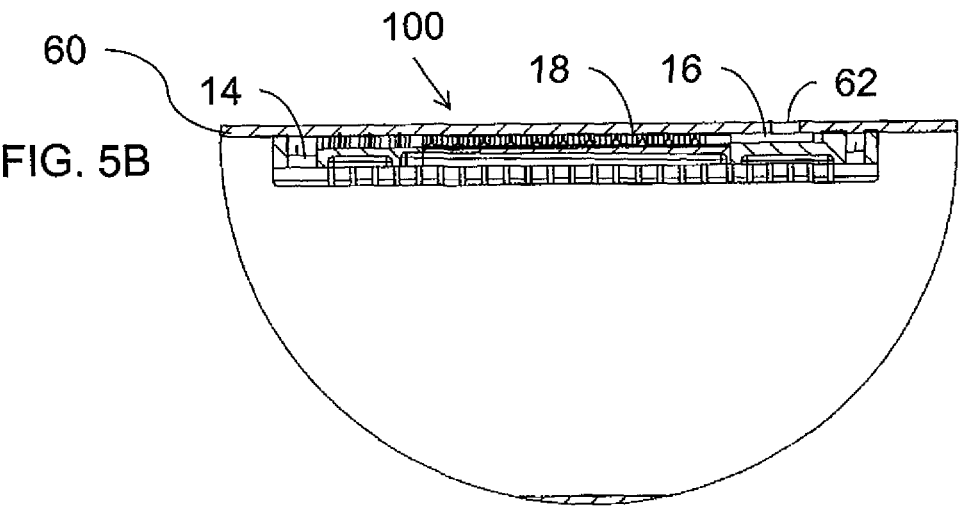
FIG. 5B is an enlarged view of the region of FIG. 5A marked by circle "AE"
Figure 5C:
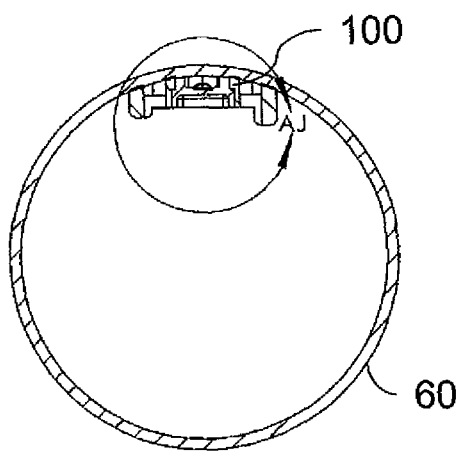
FIG. 5C is a cross-sectional view taken along the line AH-AH of FIG. 5A.

In the exemplary implementation illustrated here, drip emitter 100 features a double rigid frame structure, including the aforementioned frame 20 and an outer frame 24. Outer frame 24 is here a fully encompassing frame, thereby providing extensive surface contact for bonding to the irrigation hose wall and ensuring that entry of water to the drip emitter occurs only through the filtering slit structure of inlet 14. Inner frame 20 is open at one end to define the beginning of the first part of flow path 18a, has two sides between which elastomeric component 10 is deployed to define the second part of flow path 18b, and terminates at a closed end which defines drip outlet 16 in the form of a recess where a hole 62 through the irrigation hose is to be formed (FIG. 5B). According to a further optional feature, rigid polymer component 12 features a downwardly projecting ridge 13 along one side (see FIGS. 3A-3D). This serves to provide easily identifiable orientation of the drip emitter for automated handling in a production line. Clearly, alternative features may be used to provide identifiable orientation, as will be clear to one ordinarily skilled in the art.

Figure 5D:
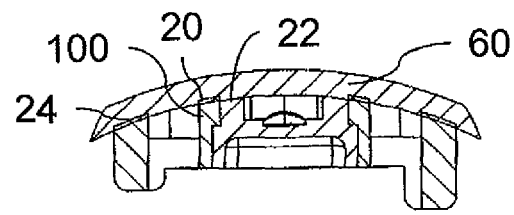
FIG. 5D is an enlarged view of the region of FIG. 5C marked by circle "AJ"
Figure 6F:
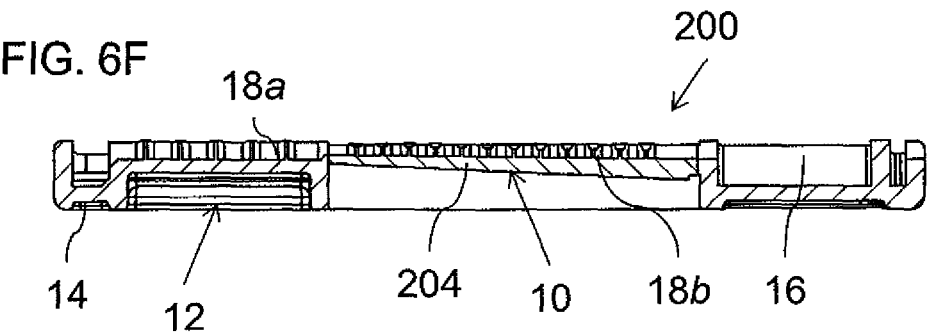
FIG. 6F is a cross-sectional view taken along the line BD-BD of FIG. 6B.

As mentioned earlier, the elastomeric materials employed for elastomeric component 10 typically bond less well with the wall of the irrigation hose. On the other hand, it is important to achieve sealing abutment between margins 22 of elastomeric component 10 and the hose wall. For this reason, certain particularly preferred embodiments of the present invention deploy margins 22 recessed relative to frame 20 as best seen in FIGS. 4A and 4B. When frame 20 is welded to the inner surface of the wall of the hose, slight penetration occurs of the contact surfaces of frame 20 and 24 into the hose wall. Margins 22 are thus brought into contact with the surface of the wall of irrigation hose 60, as best seen in FIG. 5D, thereby ensuring sealing contact between margins 22 of elastomeric component 10 and the wall of irrigation hose 60. Depending on the type of elastomeric material used, the elastomer may also contribute to the weld with the hose, but to a slightly lesser depth. In most cases, recessing of between 0.05 mm and 0.2 mm is used, depending primarily on the dimensions of the irrigation hose and parameters of the welding process to be used during production.

To complete the description of FIGS. 1A-5D, it will be noted that the implementation illustrated here, for example, provides a large area inlet in the form of multiple slits 14 deployed between inner frame 20 and outer frame 24, thereby providing a large area filter inlet.

Example of Over-Tooth Bypass Clearances

Referring now to FIGS. 6A-7C, which illustrate an exemplary embodiment of a drip emitter, generally designated 200. Generally speaking, drip emitter 200 is similar to drip emitter 100 described above, with equivalent elements being similarly labeled. Drip emitter 200 differs from drip emitter 100 primarily in that the under-tooth bypass spaces are here replaced by over-tooth bypass clearances.

Thus, in the exemplary embodiment illustrated here, fluid flow pathway 18a, 18b is formed with a flow restriction implemented as a labyrinth formed by a sequence of baffles 202 and a base 204. At least part of the sequence of baffles 202 and base 204 corresponding to the variable geometry flow path 18b is integrally formed as part of single piece elastomeric component 10.

Figure 7A:
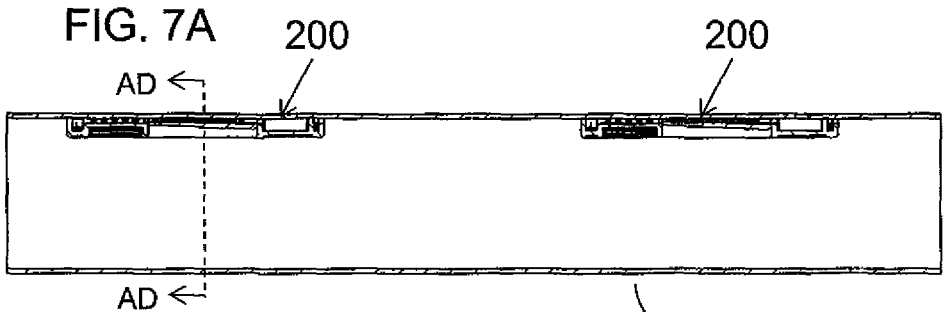
FIG. 7A is a longitudinal cross-sectional view taken through an irrigation hose employing a plurality of the drip emitters of FIG. 6A.
Figure 7C:
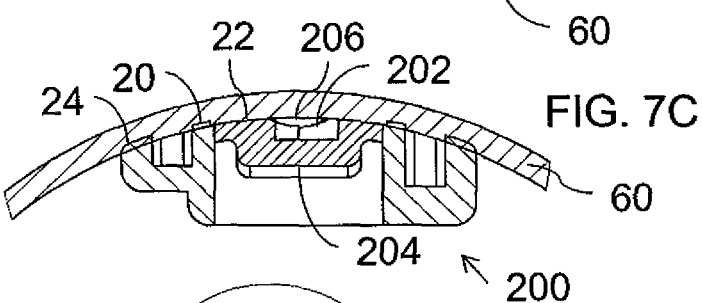
FIG. 7C is an enlarged view of the region of FIG. 7B marked by circle "AG"
Figure 7B:
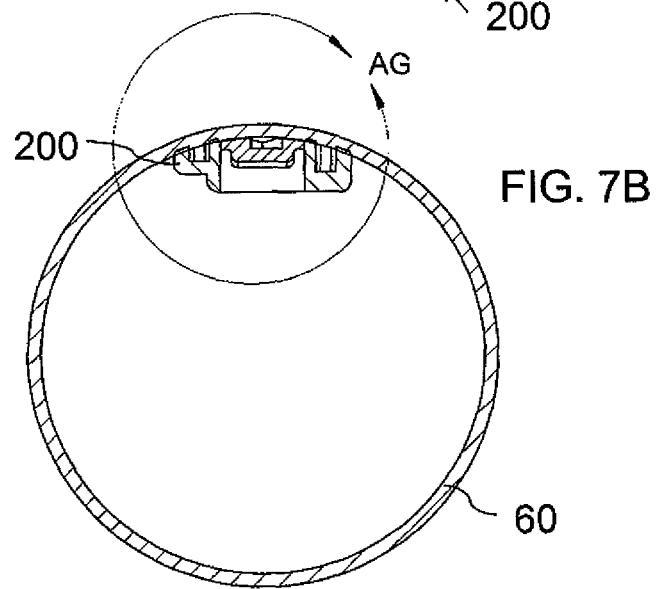
FIG. 7B is a cross-sectional view taken along the line AD-AD of FIG. 7A.

Elastomeric component 10 here also includes a series of bypass clearances 206 formed along the top edges of the sequence of baffles 202 such that, when welded to the inner surface of the irrigation hose as shown in FIGS. 7A-7C, bypass clearances 206 define bypass spaces between the sequence of baffles 202 and the inner surface of the wall of irrigation hose 60. At least part of base 204 is exposed to the fluid pressure within irrigation hose 60 such that increased fluid pressure within the irrigation hose causes progressive closing of bypass clearances 206, thereby regulating the flow rate through the drip emitter.

Here too, as best seen in FIGS. 6C and 6D, elastomeric component 10 preferably has margins 22 recessed relative to frame 20, to achieve sealing abutment with the internal surface of irrigation hose 60 when assembled (see FIG. 7C), for example as described above.

Progressive closing of bypass clearances 206 against the internal surface of irrigation hose 60 may be ensured by varying the size and shape of the clearances, as well as the thickness and/or shape of base 204. In the exemplary case illustrated here, base 204 is implemented with a gradually increasing thickness along the flow path (see FIG. 6F) while the depth of bypass clearances 206 increases (compare cross-sectional views of FIGS. 6C and 6D).

This embodiment also differs somewhat from the previous embodiment in that the shape is configured to provide a wider filter inlet on either side of the fixed geometry labyrinth portion, and the structure of the support for outlet 16 differs. In other respects, the structure and operation of drip emitter 200 is analogous to that of drip emitter 100 described above, and will be understood by reference to the above description.

Example of Variable Turbulence Labyrinth

Referring now to FIGS. 8A-8E, which illustrate an exemplary embodiment of a drip emitter, generally designated 300. Generally speaking, drip emitter 300 is similar to drip emitter 100 described above, with similar elements being similarly labeled. Drip emitter 300 differs from drip emitter 100 primarily in that it employs a labyrinth flow restriction with a variable cross-section flow geometry instead of the aforementioned under-tooth bypass spaces. This exemplary embodiment also illustrates an implementation in which both the fixed geometry labyrinth part of the flow path 18a and the variable geometry flow path 18b are integrally formed as part of the elastomeric component 10.

Thus, in the exemplary embodiment illustrated here, fluid flow pathway 18a, 18b is formed with a flow restriction implemented as a labyrinth formed by a sequence of baffles 302 and a base 304. At least part of the sequence of baffles 302 and base 304, and in this case the entirety of the sequence, corresponding to the fixed geometry flow path 18a and the variable geometry flow path 18b, is integrally formed as part of the elastomeric component 10. Sequence of baffles 302 and base 304 are shaped such that turbulence of the fluid flow through the labyrinth increases when the fluid pressure within the irrigation hose increases, thereby regulating the flow rate through the drip emitter.

The principle of operation of this regulation technique is discussed in detail in my aforementioned published Patent Application No. WO 2008/035335, which is hereby incorporated in its entirety by reference as if set out herein. An example of a suitable form for generating variable turbulence is illustrated in FIGS. 8B and 8C where the junction between baffles 302 and base 304 features a transition region 306. Specifically, baffles 302 of the variable geometry flow path 18b have an upright upper wall portion, similar to the labyrinth teeth illustrated in the previous exemplary embodiments, but are modified by a thickened root portion which forms a sloped transition region 306 between the upper wall portion and base 304. The sloped transition region 306 may be a flat surface at an obtuse angle to the base, or may be a gradual curve or any other shape which smoothes the transition between the upright part of the baffle and the base, thereby facilitating laminar flow, at least in the bottom part of the labyrinth. As pressure increases on the underside of base 304, the transition region becomes shallower and the channel approaches a rectangular cross-section, thereby tending to generate increased turbulence and corresponding decrease in flow rate.

Here too, the channel is preferably shaped to provide progressive variation, typically by making transition region 306 progressively deeper and/or more steeply angled along the flow path. In the exemplary case illustrated here, increased depth and steepness of the transition region are achieved without increasing the cross-sectional area of the channel by combining the variations with a gradual narrowing of the channel. Additionally, or alternatively, a graduated effect can be achieved by providing graduated thickness of base 304 as illustrated, for example, with reference to drip emitter 200 above.

In this exemplary embodiment, inner frame 20 does not form part of the hose contact interface, instead being implemented as an underlying support for the elastomeric component 10. Instead, it is the upper margins 22 of elastomeric component 10 which provide the sealing contact and/or bonding with the inner surface of the irrigation hose, thereby sealing along the sides of flow path 18a, 18b.

As best seen in FIG. 8E, frame 20 and elastomeric component 10 are preferably formed with interlocking features and/or elements to provide additional mechanical support, in addition to the bonding of the elastomer and the plastic of the frame, thereby clamping elastomeric component 10 against the inner surface of the hose when welded to the inner surface of the hose.

In other respects, the structure and operation of drip emitter 300 is similar to that of drip emitter 100 described above, and will be understood by reference to the above description.

Exemplary Bi-Component Drip Emitter Employing Thermosetting Elastomers

The various exemplary embodiments of the present invention illustrated thus far are suitable for implementation using a range of elastomer and rigid polymer materials which achieve intimate bonding during the bi-component injection molding production process.

It has been proposed that thermosetting elastomer, such as silicone rubber (referred to herein simply as "silicone") or other thermosetting polymers such as EPDM (Ethylene Propylene Diene Monomer) rubber, would be advantageous for use as an elastomer in regulated drip emitters, since they combine a range of advantageous mechanical and chemical properties. It is known that silicone can be injected and can also be used as a component in bi-component injection molding techniques combining thermosetting and thermoplastic components (such as PE). Silicon, however, may fail to bond with adjacent thermoplastic polymer components such as PE. A further aspect of the present invention relates to implementations of bi-component drip emitters employing thermosetting elastomeric materials. For the purpose of simplicity of presentation, an implementation of the invention will now be described by reference to a preferred but non-limiting example of silicone as the thermosetting elastomeric material.

By way of a non-limiting example, FIGS. 9A-12B illustrate an exemplary drip emitter, generally designated 400, constructed and operative according to a fourth embodiment of the present invention. Generally speaking, drip emitter 400 is similar to drip emitter 200 described above, but has been modified according to the teachings of the present invention to render it suitable for implementation using silicone. Thus, this embodiment includes baffles 402, base 404 and over-tooth clearances 406, which are structurally and functionally analogous to corresponding features 202, 204, and 206, respectfully, from drip emitter 200 described above.

It should be noted that silicone and other thermosetting elastomeric materials can equally be used in other embodiments of the present invention, or other bi-component drip emitters. Such embodiments may optionally implement modifications corresponding to some or all of the features described herein, as will be clear to one ordinarily skilled in the art on the basis of this description.

An optional aspect of drip emitter 400 including an elastomeric component 410 formed from silicone is that elastomeric component 410 and rigid polymer component 412 are formed with complementary interlocking features, i.e., elements formed so as to mechanically retain elastomeric component 410 engaged with rigid polymer component 412. The mechanical engagement avoids reliance upon surface bonding, thereby providing a stable configuration even with silicone.

In the example illustrated here, the silicone elastomeric component 410 is formed with a laterally projecting ridge and/or rib 408 extending along its edges, and preferably around most of the periphery of elastomeric component 410, as visible in FIG. 10B. The facing surfaces of frame 412 are formed with a complementary slot 409 within which ridge 408 is engaged. Parenthetically, it should be noted that, although shown in an exploded view in FIGS. 10A and 10B, the two (component 410 and frame 412) are preferably formed directly in their engaged state by bi-component injection molding, and are not normally separated.

It will be noted that slot 409 is shaped to provide interlocking retention features opposing extraction of silicone elastomeric component 410 either upwards or downwards. An equivalent function could be achieved by reversing the structure, with a ridge in the frame engaging a slot in elastomeric component 410. Where desired, a more complex structure of interleaved components (not shown), or embedded anchoring features (not shown), may be provided.

In addition to the mechanical engagement of the elastomeric component within the frame, it will be noted that, when frame portions 20 and 24 are welded to the inner surface of irrigation hose 60, as illustrated, for example, in FIG. 12B, margins 22 of the silicone component are clamped against the hose surface, thereby serving to further secure the silicone component and to ensure an effective watertight seal along the edges of variable geometry flow path 18b.

An additional distinguishing feature of drip emitter 400 compared to drip emitter 200 is that elastomeric component 410 is preferably formed with an integrated outlet chamber recess 416. Since the silicone component does not bond to the rigid polymer component to ensure a reliable seal along the length of the labyrinth flow path and outlet region, an integrated outlet chamber recess is preferably provided to avoid possible leakage along the interface between the components which might otherwise bypass the labyrinth flow restriction.

In certain cases, it may be preferred to provide additional mechanical support for the elastomeric component. In the exemplary case illustrated here, frame 412 includes a support shelf 413 which provides extra support for integrated outlet chamber recess 416, as best seen in FIGS. 10A and 12A.

Exemplary Embodiment Showing Elements Related to the Molding Process

FIGS. 13A, 13B and 13C illustrate perspective bottom, top and expanded top views of another exemplary embodiment of a bi-component drip emitter 500. Exemplary emitter 500 includes an elastomeric flow control component 510 molded, for example from a thermoplastic elastomeric polymer. Exemplary emitter 500 includes a relatively rigid frame 512. Drip emitter 500 is similar to drip emitter 100 described above. Optionally, the height of the interface between the two materials (elastomeric flow control component 510 and relatively rigid frame 512) may be greater than the minimal thickness of either component. For example, the minimal thickness of either component may be the minimum thickness of the flow control component which typically may optionally range between 0.3 mm and 0.7 mm. In some embodiments the minimal thickness the flow control component may optionally range between 0.1 mm and 0.9 mm. Typically the thickness of the interface between the elastomeric component and the relatively rigid frame may optionally range between 1.0 mm and 2.0 mm. In some embodiments the thickness of the interface between the elastomeric component and the relatively rigid frame may optionally range between 1.0 mm and 5.0 mm.

In some embodiments, dripper 500 may be formed in their engaged state by a bi-component injection molding process, for example, as described below. In exemplary emitter 500, some optional features are illustrated. The optional features may facilitate the molding process.

In some embodiments, an elastomeric component 510 may be directly injected into rigid frame 512. For example, in embodiment 500, elastomeric material may be injected into outlet chamber recess 516. The elastomeric material may spread to form a variable resistance labyrinth flow path 518*b* including baffles 502 and a base 504 in a single molded piece of elastomer (component 510).

In some embodiments, an interface 528 (illustrated for example in FIG. 14*a*) between elastomeric component 510 and frame 512 at outlet chamber recess 516 is made rough by numerous protrusions 531. The roughness may increase the surface area of interface 528. Increased surface area may improve the bonding between elastomeric component 510 and frame 512. In some cases, improved bonding may be desirable near the injection site of the elastomer. Drip emitter 500 includes location markings 530*a* and 530*b*. Markings 530*a,b* may help in automatic handling, machining and mounting of emitter 500.

Drip emitter 500 includes a series of baffles 502 and bypass spaces 506 similar to previous embodiments. The operation of drip emitter 500 is similar to that of drip emitter 100 and the others described, for example, herein.

FIG. 14A is a view from above of emitter 500. Crosscut views along lines BN and BP are illustrated in FIGS. 14B and 14C respectively.

In some embodiments, a height 27 of an interface 28 between rigid polymer component 512 and elastomeric component 510 is greater than a minimum height 29 of elastomeric component 510 (the thickness of base 504) in the cross section. Optionally, height 27 of interface 28 may be large in order to increase the area of attachment between rigid polymer component 512 and elastomeric component 510. Optionally, the thickness (height 29) of base 504 may be adjusted to control the sensitivity of the flow regulator to changes in fluid pressure in the hose.

FIG. 15 illustrates a longitudinal crosscut view along line BM of FIG. 14A.

Exemplary Process of Production

Figure 16A:
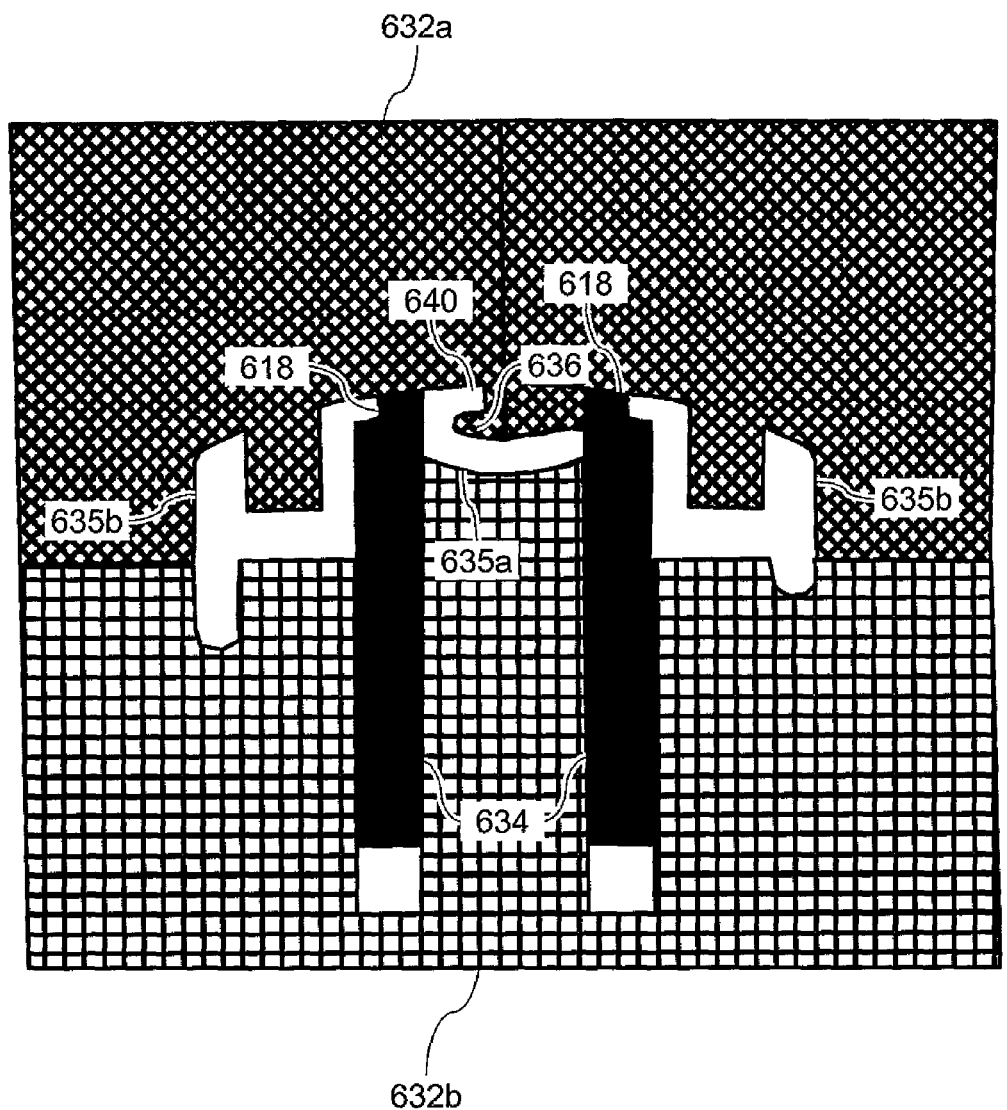
FIGS. 16A, 16B and 16C illustrate an exemplary embodiment injection mold for use in bi-component molding of a drip emitter having an elastomeric flow control element and stages of an exemplary molding method.
Figure 16B:
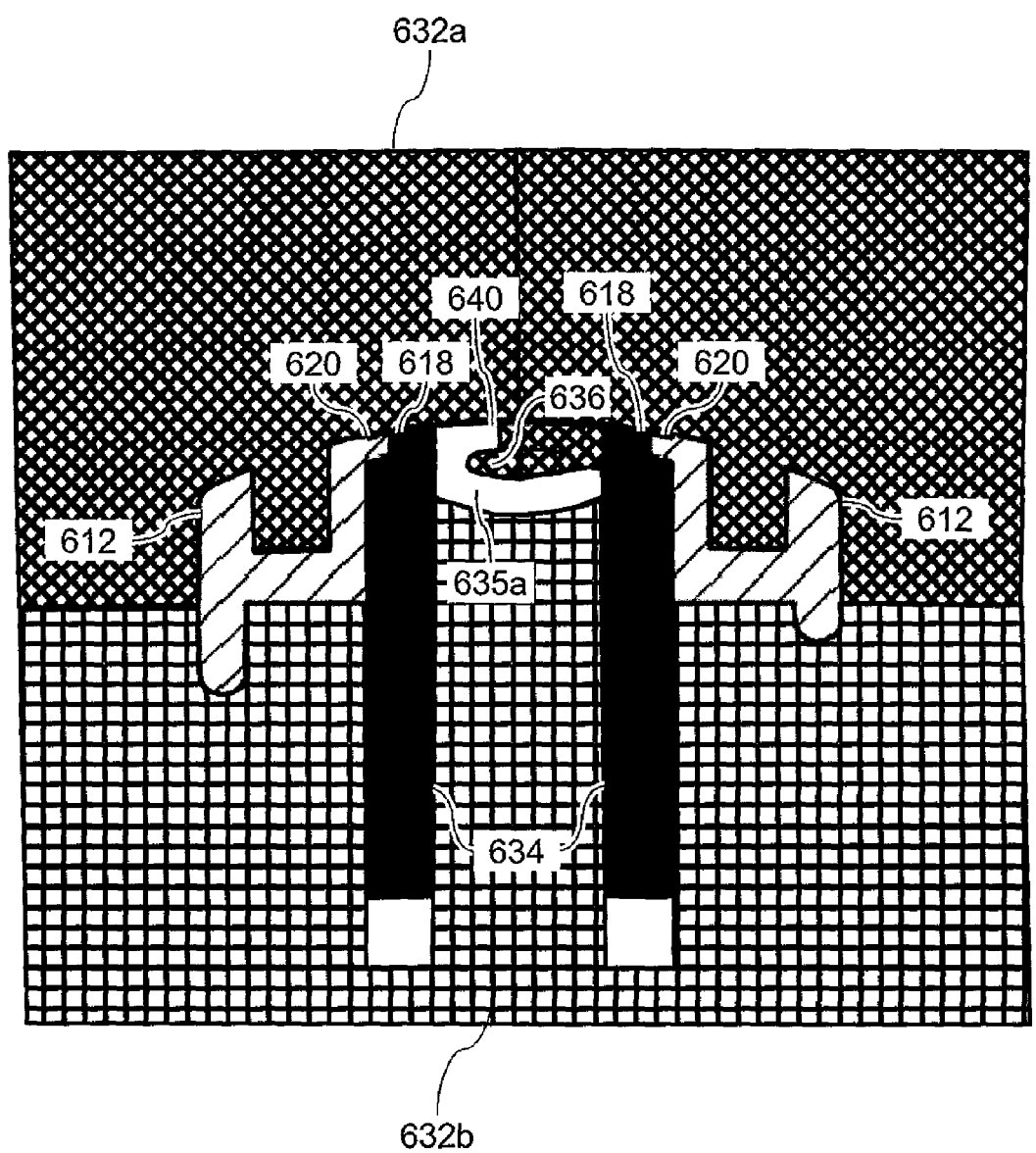
Figure 16C:
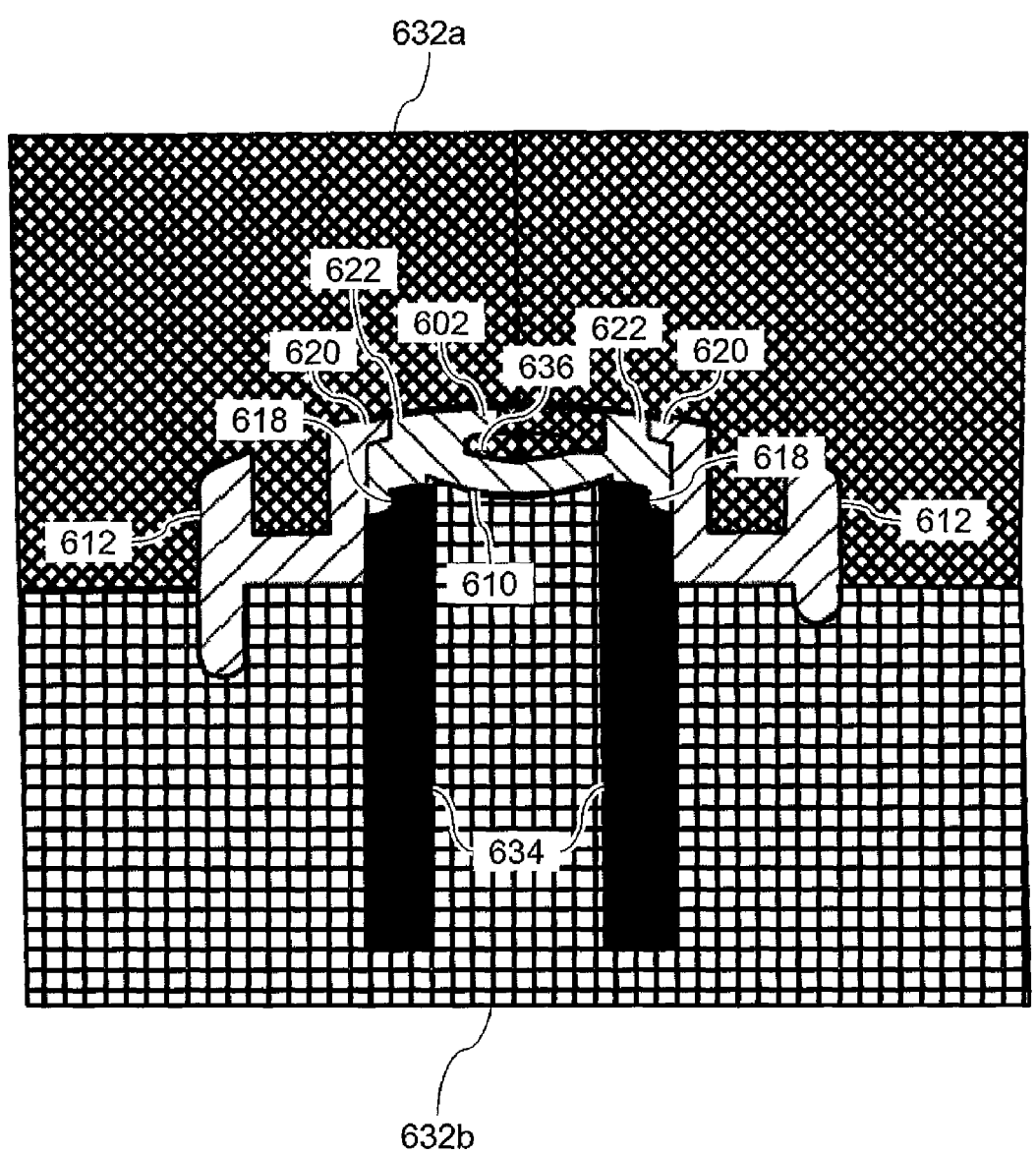

FIGS. 16A-16C illustrate an exemplary three-stage method and an injection mold that may be used to form the bi-component drip emitters described herein according to some embodiments of the invention. Optionally, bi-component injection mold 600 includes a first section 632*a*, a second section 632*b* and a moveable divider 634. Optionally, divider 634 may be in the shape of a sleeve surrounding a central cavity 635*a* in mold section 632*b*.

In some embodiments, the molding process may be performed in three stages. For example, during the first stage, the frame, for example frame 512 (see FIG. 13A), is molded using a thermoplastic molding compound for example, polyethylene or polypropylene. Optionally, the molding compound may be injected into a surrounding cavity 635*b*.

In some embodiments, during the second stage, an elastomeric flow control component (for example, component 510 seen in FIG. 13A) may be molded. Optionally, the elastomeric molding compound may include thermoplastic material, for example, EPDM rubber. Alternatively or additionally, the elastomeric molding compound may include a thermosetting molding compound, for example, silicone rubber. In some embodiments, a baffle 602 (for example see FIG. 16C) may be formed on the elastomeric flow control component in an undercut 640 on the first mold section. Optionally, a bypass space (for example bypass space 506 and/or bypass space 806) may be formed by a projection 636 between undercut 640 and central cavity 635*a*.

During the third stage, the molded bi-component part is unmolded. Optionally, baffle 602 may be stripped from the mold undercut 640 by elastically deforming baffle 602 as mold sections 632*a* and 632*b* are separated. Baffle 602 may return to its intended shape once the mold has been separated away.

In some embodiments, during the first stage, the two sections 632*a* and 632*b* of a mold are closed, and divider 604 of second mold section 632*b* is positioned in abutting relationship with mold section 632*a* (for example, see FIGS. 14A and 14B).

In some embodiments, when the thermoplastic molding component is injected, the hollow of mold section 632*b* may be divided into two cavities, for example, outer cavity 635*b* and inner cavity 635*a*. Optionally, a thermoplastic molding component (for example see FIG. 16C) may be injected into the outer cavity 635*b*. Optionally, divider 634 prevents the thermoplastic molding compound from entering inner cavity 635*a*. An example of molded frame 612 may be seen in FIG. 14B in place of cavity 635*b*.

in some embodiments, during the second stage, mold sections 632*a* and 632*b* remain positioned as in the first stage, but divider 634 is moved away from mold section 632*a* (for example, see FIG. 14C). In the exemplary second configuration, the hollow of the mold consists of central cavity 635*a* and the area vacated by the repositioning of divider 604. Optionally, a thermoplastic elastomeric molding compound is injected into central cavity 635*a* during stage two for molding elastomeric flow control component 610.

In the example of FIGS. 16*a* and 16*b*, when divider 604 is in its upper position (for example see FIG. 14B) an inwardly extending stepped areas 618 permits formation of a rib 620 on frame 612. When divider 634 is in its lower position, (for example see FIG. 14C) a complementary ridge 622 is formed on the elastomeric flow control component 610.

Figure 17A:
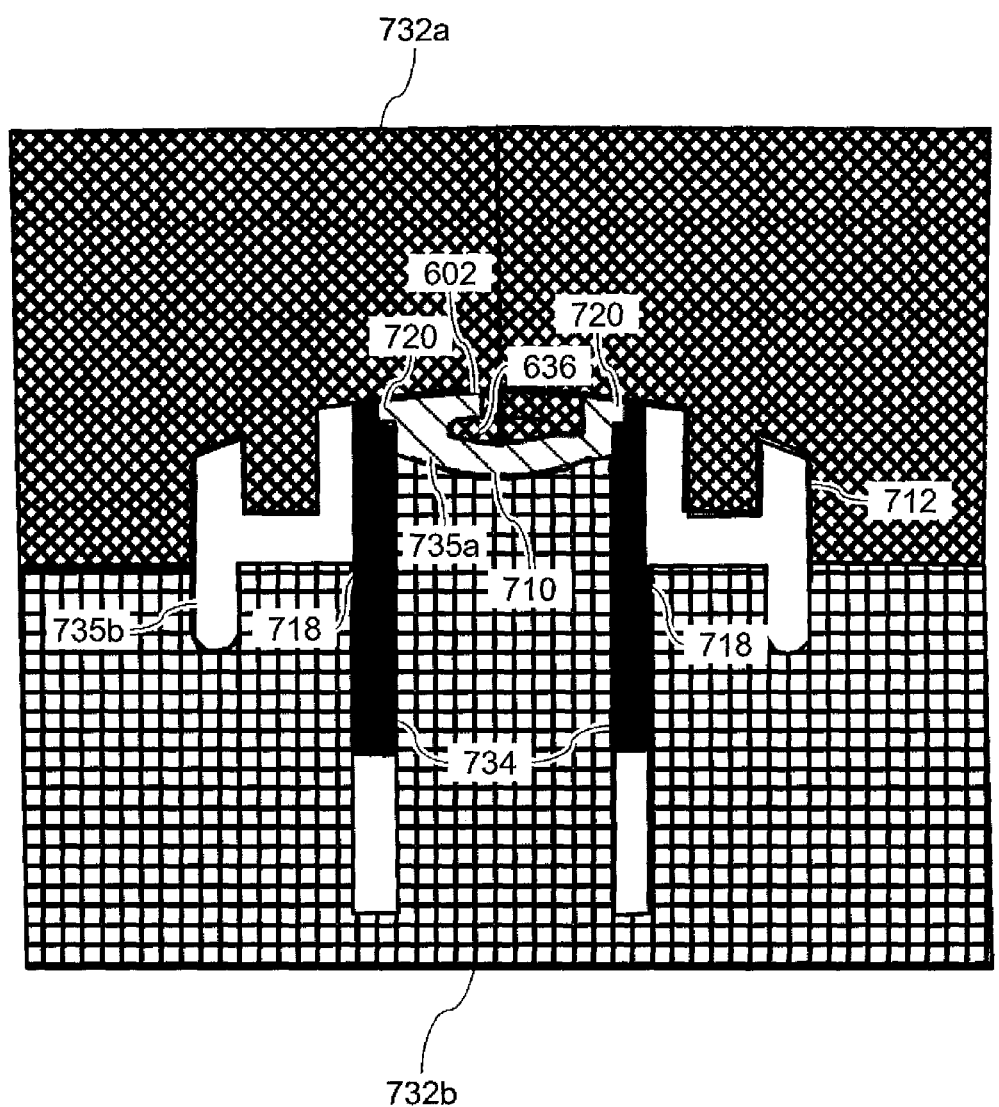
FIGS. 17A and 17B illustrate another exemplary embodiment of an injection mold for use in bi-component molding of a drip emitter having an elastomeric flow control element.

FIGS. 17A,B illustrates another exemplary three-stage method and another exemplary injection mold that may be used to form the bi-component drip emitter, for example as described herein according to some embodiments of the invention. In the example of FIGS. 17A,B, the elastomeric component is formed before the relatively rigid polymeric component. In the example of FIG. 17, the elastomeric flow component may be mechanically retained in place by ribs formed in the molding process.

In some embodiments, a mold 700 includes a first section 732a and a second section 732b that are similar to sections 632a,b. Section 732b includes a central cavity 635a and an at least partially surrounding cavity 635b. In FIG. 17A, central cavity 635a is shown filled with an inner elastomeric flow component 710.

In the exemplary embodiment, ribs 720 may be formed on elastomeric flow component 710 by a stepped area 718 of a divider 734.

Figure 17B:
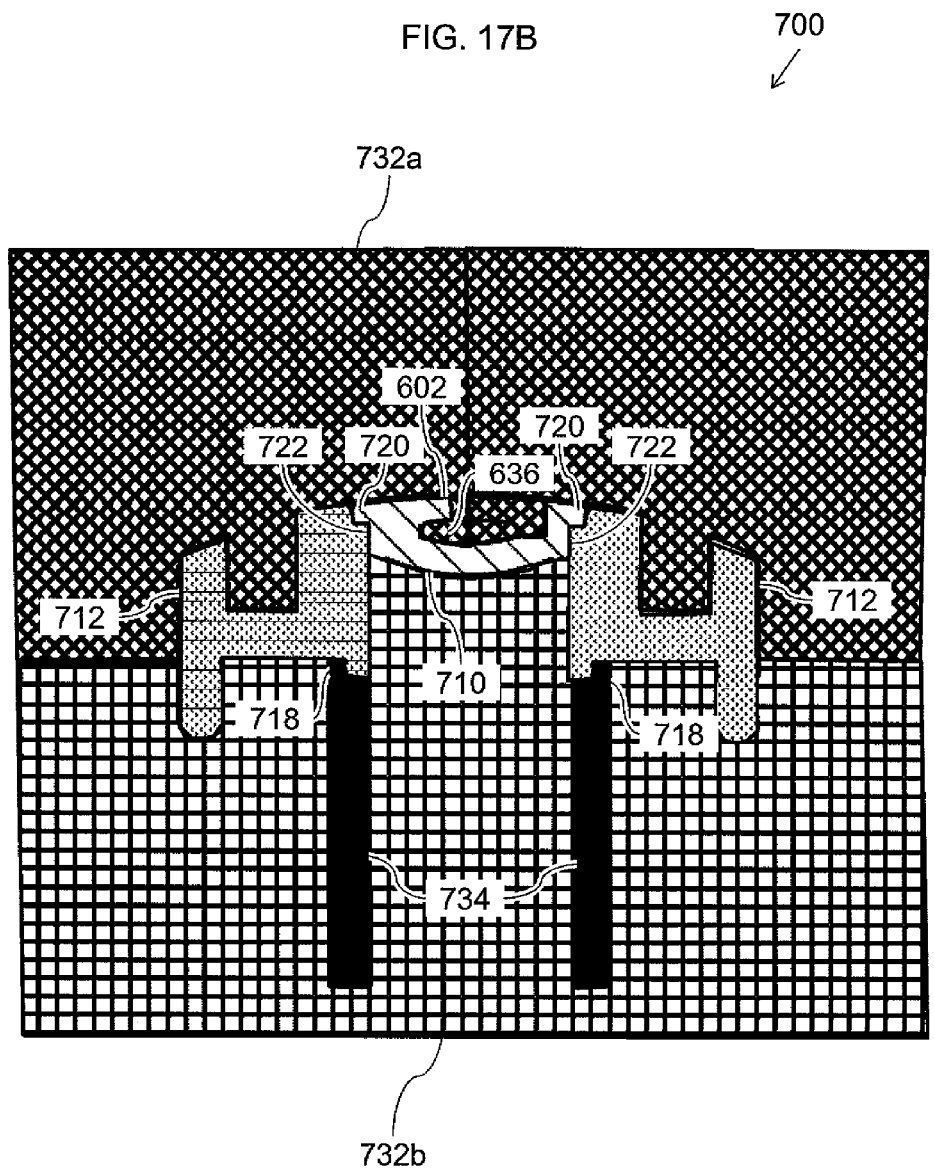

In the example of FIG. 17B, after forming elastomeric flow control component 710, divider 734 is retracted. Optionally, after retracting divider 734, a thermoplastic molding compound may be injected into surrounding cavity 735b. Optionally, the thermoplastic material forms a relatively rigid frame 712. Optionally, complementary ridges 722 may be formed on relatively rigid frame 712.

In the example, when emitter 700 is attached to the inner wall of an irrigation hose, ribs 720 will be sandwiched between ridges 722 and the inner wall of the hose. Optionally, the sandwiching may mechanically retain elastomeric component 710 in engagement with the relatively rigid polymer component.

Figure 18A:
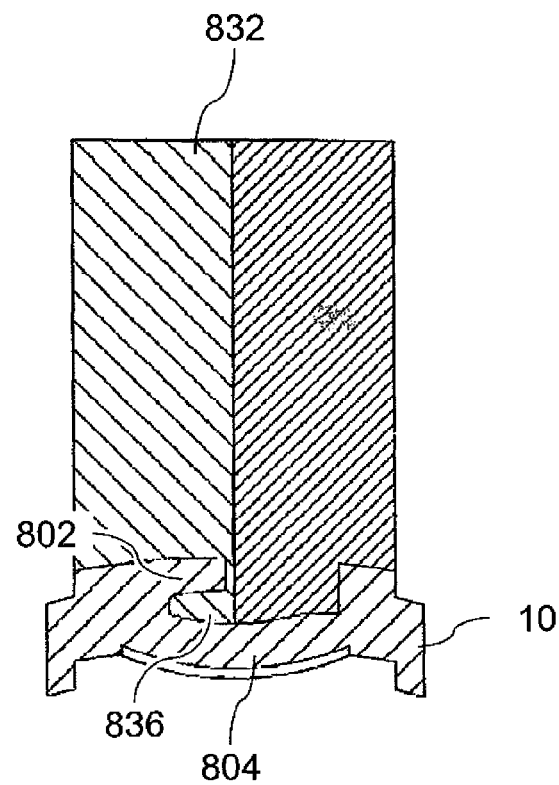
FIGS. 18A and 18B illustrate a mold for use in bi-component molding of a drip emitter having an elastomeric flow control element and details of molding of baffles and bypass spaces.

FIG. 18a illustrates an exemplary method of molding a series of baffles 802 and a bypass space 806 on a single piece elastomeric flow component 10. Optionally, bypass space 806 is located between baffles 802 and a pressure responsive base 804.

Figure 18B:
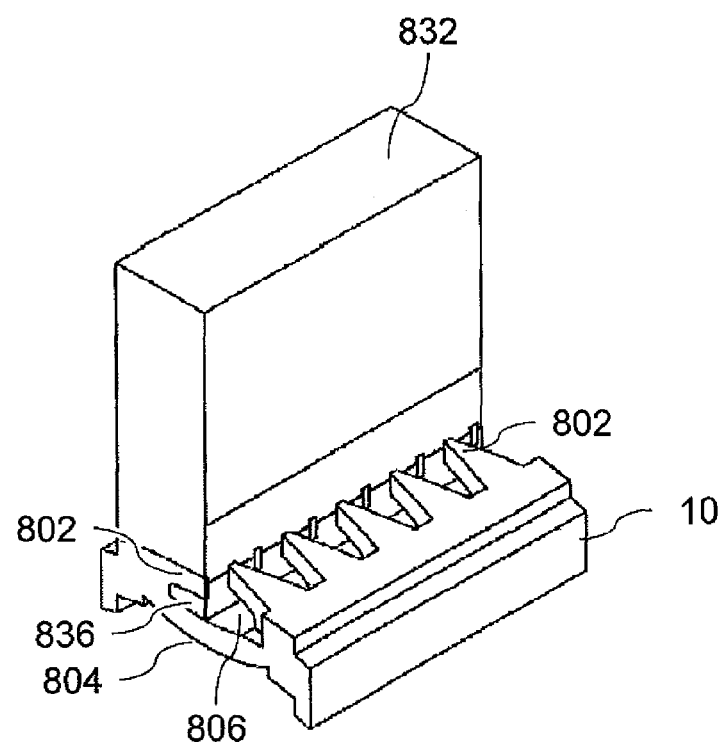

In the example of FIGS. 18a and 18b, a mold section 832 includes a projection 836 which forms bypass space 806. Optionally, baffles 802 are formed in an undercut in mold section 832. For illustration purposes, mold section 832 is shown in FIG. 18a as having two parts. In FIG. 18b one of the parts is removed to show the 3D form of baffles 802 and space 806. In some embodiments, section 832 may be a single piece.

In some embodiments, when elastomeric flow control component 10 is unmolded, baffle 802 may be stripped from the undercut by elastically deforming baffle 802 as mold section 832 is lifted away. Baffle 802 may return to its intended shape once the mold has been separated away.

Some Exemplary Embodiments of Drip Emitters Described Above may Include One or More of the Following Optional Features i) the rigid polymer frame may surround the flow control component on at least three sides;

ii) the drip emitter may be configured for attachment to an inner surface of an irrigation hose around less than half of the periphery of the irrigation hose;

iii) the polymer material forming the frame may be a thermoplastic material, for example, polyethylene or polypropylene;

iv) the elastomeric material forming the flow control component may be a thermoplastic material, for example, EPDM rubber;

v) the elastomeric material forming the flow control component may be a thermosetting material, for example, silicone rubber;

vi) the bypass spaces may provide clearance under the baffles;

vii) the bypass spaces may provide clearance over the baffles allowing flow of water between the baffles and the inner surface of the wall of the hose that varies according to the response of the base to changes in water pressure;

viii) the baffles may have a thickened root portion which forms a sloped transition region between an upright upper wall portion and the base such that, when the fluid pressure within the hose increases, the sloped transition regions becomes progressively flattened to define an increased turbulence flow path geometry, thereby regulating the flow rate through the drip emitter;

ix) an interface formed by margins of the elastomeric element may be configured to abut the inner surface of the hose delimiting the variable restriction;

x) the interface may include a part of the frame that projects beyond the margins of the elastomeric element so that when the drip emitter is attached to the inner wall of the hose, for example, by welding, the frame penetrates into the wall to a greater degree than the margins of the elastomeric element;

xi) the elastomeric element and the frame may be formed as an integral unit;

xii) at least part of the labyrinth may comprise a sequence of baffles and a base, the sequence of baffles and the base being an integral part of the thermoset elastomeric element;

xiii) at least part of the labyrinth flow restriction arrangement may have a spatially varying geometry;

xiv) the elastomeric element and the rigid polymer component may be formed with complementary interlocking elements that mechanically retain the elastomeric element engaged with the frame;

xv) the complementary interlocking elements may be configured such that the elastomeric element is mechanically retained against disengagement from the frame in any direction;

xvi) the interlocking elements may be comprised of a rib on one component of the drip emitter and a receptacle for the rib on the other component of the drip emitter;

xvii) the elastomeric element may include a margin that seals against the inner surface of the irrigation hose to define the drip outlet;

xiix) the frame may be formed of a thermoplastic polymer, for example, polyethylene or polypropylene;

xix) the elastomeric material may be thermosetting, for example, silicone rubber;

xx) the labyrinth may be comprised of two sets of spaced teeth on opposite sides of the flow control component;

xxi) the teeth on one side of the flow control component may be longitudinally offset from the teeth on the other side to define the labyrinth;

xxii) the configuration of the teeth at the inlet end of the flow control component may be different from the configuration of the teeth at the outlet end;

xxiii) the portion of the labyrinth at the inlet end may reduce the pressure of the water at the outlet to substantially atmospheric pressure;

xxiv) the portion of the flow control component at the outlet end may be responsive to variations in pressure in the hose to control the flow of water through the outlet;

xxv) the flow control component may include longitudinally extending sides, and transversely extending ends, with the inlet openings and the outlet at the ends;

xxvi) the flow control component may also include one or more inlet openings on at least one side.

Some embodiments of the invention pertain to an irrigation system formed by an irrigation hose, and a plurality of drip emitters, for example as described herein, that are attached, for example by welding, to an inner surface of the irrigation hose at intervals along its length.

Some embodiments of the invention pertain to a bi-component injection molding method for manufacturing a drip emitter, for example as described herein employing a injection mold having a first section that is fixed during the molding process, and a second section that includes a first part that is fixed during the molding process, and a second movable divider, in which the movable divider of the second section positioned in abutting relationship to a surface of the first section, injecting a first polymer into a space formed between the first and second sections to form a frame for the drip emitter, positioning the movable divider of the second section at a predetermined distance away from the first section to form a clearance between the first and second sections, and injecting a second elastomeric polymer into the clearance to form a flow control component including an inlet, an outlet and a variable fluid flow resistance pathway between the inlet as a unitary structure, and the frame and the flow control component also formed as a unitary structure.

Some embodiments of the invention pertain to a method of manufacturing a drip emitter having a labyrinth flow control pathway as described herein using a bi-component injection molding process in which the elastomeric teeth of the labyrinth are formed by complementary undercuts on the mold, and which is unmolded by reversibly displacing the labyrinth teeth.

The methods as described for example above may include one or more of the following additional optional features:

xxvii) the molding compound for the frame may be a thermoplastic, for example, polyethylene or polypropylene;

xxiix) the molding compound for the elastomeric element may be thermosetting, for example, silicone rubber;

xxix) when the mold sections are separated, the mold grooves may reversibly displace the molded teeth.

Some embodiments of the invention pertain to a bi-component injection mold for molding a part formed of an elastomeric polymer component and a relatively rigid polymer frame component which is formed by a mold with a moving divider. Optionally, the movable divider may be positionable to divide the hollow portion of the mold into a plurality of cavities. Optionally, the divider may also be positionable to provide an interface between at least two of the cavities.

In some embodiments the mold may be formed of two sections. A first section, optionally, does not move during the molding operation, and a second section optionally includes a first part that does not move during a molding operation and a movable divider, that is movable between a first and a second position. Optionally, in the first position, the divider may be positioned in abutting relationship to a surface of the first section. Optionally, in the first position, the divider may divide the hollow of the mold into two cavities. In the second positions, the moveable divider of the second section may optionally be positioned at a predetermined distance away from the first section to form an interface between the two cavities.

The mold as described, for example, above may include one or more of the following additional optional features:

xxx) the mold may include a first set of longitudinally spaced undercuts that extend transversely to a length-wise dimension of the mold to form teeth as part of the elastomeric element;

xxxi) the mold may include a second set of undercuts that are longitudinally offset from the first set of undercuts to define a labyrinth in the molded elastomeric material;

xxxii) the mold may be configured so that when the movable divider of the second mold section is in contact with the first mold section, an outer cavity defines the configuration of the frame for the drip emitter;

xxxiii) the mold may be configured so that when the movable divider of the second mold section is in contact with the first mold section, an inner cavity defines the configuration of the elastomeric component;

xxxiv) the mold may be configured so that when the movable divider of the second mold section is at the predetermined distance from the first mold section, clearances between the divider and the first section define the interface between the frame and elastomeric component;

xxxv) the undercuts in the first mold section and the inner cavity formed in the second mold section may define the labyrinth teeth, and the base below the labyrinth teeth as a unitary part;

xxxvi) the first and second cavities formed in the second mold section when the movable divider of the second mold section is at the predetermined distance from the first mold section including the undercuts in the first mold section may define the frame and the elastomeric component including the teeth as a unitary part;

xxxvii) the clearances between the two mold sections and the undercuts in the mold may define an undercut bypass clearance below the teeth, or an over-tooth bypass clearance between the teeth and the inner wall of the hose, or a variable-turbulence bypass clearance above the teeth;

xxxviii) the configuration of the mold projections at one end of the first section may be different from the configuration of the projections at an opposite end so that the molded elastomeric teeth at the inlet end of the flow control component form a pressure regulator to reduce the water pressure at the outlet to substantially atmospheric pressure;

xxxix) the configuration of the mold projections at one end of the second section may be spatially varying;

xl) the first and second mold cavities may include complementary portions that form interlocking element on the frame and the elastomeric component;

xli) the complementary portions of the mold cavities may form a rib on the frame or the elastomeric component, and a receptacle for the rib on the other of the two parts;

xlii) the first mold section may include two parts that are separable to unmold the drip emitter;

xliii) the moveable divider of the second mold section may be a sleeve that at least partially surrounds the inner cavity.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A drip emitter for attachment to an inner surface of a wall of an irrigation hose, comprising:
   A) a water inlet for receiving water from the irrigation hose;
   B) a drip outlet for releasing water through an opening in the wall of the irrigation hose;
   C) a fluid flow pathway from said water inlet to said drip outlet, said fluid flow pathway including a labyrinth flow restriction, at least part of said labyrinth flow restriction being formed in a one piece elastomeric component, said one piece elastomeric component including:
      i) a sequence of elastomeric baffles,
      ii) an elastomeric base underlying said sequence of elastomeric baffles, and
      iii) a plurality of under-tooth bypass spaces located between said elastomeric base and said sequence of elastomeric baffles, and
   wherein said one piece elastomeric component is configured such that, when the drip emitter is attached to the inner surface of the irrigation hose, said elastomeric base is responsive to increasing fluid pressure within the irrigation hose to progressively contact more baffles of said sequence of elastomeric baffles, thereby progressively closing respective bypass spaces of said plurality of under-tooth bypass spaces, thereby regulating a flow rate through the drip emitter.

2. The drip emitter of claim 1, further comprising a relatively rigid polymer component.

3. The drip emitter of claim 2, wherein a minimum thickness of said elastomeric base is less than a height of an interface between said one piece elastomeric component and said relatively rigid polymer component.

4. The drip emitter of claim 2, wherein said relatively rigid polymer component extends around said one piece elastomeric component on at least three sides.

5. The drip emitter of claim 2, further comprising:
   D) a hose interface including contact surfaces for interacting with the inner surface of the wall of the irrigation hose, said hose interface including:
      i) a frame formed by said relatively rigid polymer component extending around said one piece elastomeric component on at least three sides, and
      ii) a margin provided by said one piece elastomeric component for abutting the inner surface of the wall of the irrigation hose so as to delimit said at least part of said labyrinth flow restriction.

6. The drip emitter of claim 5, wherein said frame projects beyond said margin such that, when said frame is welded to the inner surface of the wall of the irrigation hose, said frame penetrates into the wall of the irrigation hose to a greater degree than said margin.

7. The drip emitter of claim 2, wherein said one piece elastomeric component and said relatively rigid polymer component are integrally formed together.

8. +The drip emitter of claim 2, wherein said one piece elastomeric component and said relatively rigid polymer component are formed by bi-component injection molding.

9. The drip emitter of claim 2, wherein said one piece elastomeric component and said relatively rigid polymer component are formed with complementary interlocking features formed so as to mechanically retain said one piece elastomeric component engaged with said relatively rigid polymer component.

10. The drip emitter of claim 9, wherein said one piece elastomeric component is formed from a thermosetting elastomer.

11. The drip emitter of claim 2, further comprising:
    D) a protrusion for increasing surface area of an interface between said one piece elastomeric component and said relatively rigid polymer component.

12. An irrigation system comprising:
    A) an irrigation hose; and
    B) a plurality of drip emitters according to claim 1 attached to an inner surface of said irrigation hose at intervals along a length of said irrigation hose.

13. A drip emitter for attachment to an inner surface of a wall of an irrigation hose around less than half of the periphery of the irrigation hose, the drip emitter comprising:
    A) a thermoset elastomeric component surrounded on at least three sides by a relatively rigid polymer component;
    B) a water inlet for receiving water from the irrigation hose;
    C) a drip outlet for releasing water through an opening in the wall of the irrigation hose; and
    D) a fluid flow pathway from said water inlet to said drip outlet, said fluid flow pathway including a flow restriction, said flow restriction being a variable geometry flow restriction formed by said thermoset elastomeric component, and wherein said thermoset elastomeric component and said relatively rigid polymer component are formed by bi-component injection molding, and wherein said thermoset elastomeric component is configured such that, when the drip emitter is attached to the inner surface of the irrigation hose, said thermoset elastomeric component is responsive to a change in a fluid pressure within the irrigation hose to modify a geometry of said variable geometry flow restriction so as to regulate a flow rate through the drip emitter, and wherein said thermoset elastomeric component and said relatively rigid polymer component are formed with complementary interlocking features such that, when the drip emitter is attached to the inner surface of the irrigation hose, said thermoset elastomeric component is mechanically retained in engagement with said relatively rigid polymer component.

14. The drip emitter of claim 13, wherein said water inlet is formed in said thermoset elastomeric component.

15. The drip emitter of claim 13, wherein said drip outlet is formed in said thermoset elastomeric component.

16. The drip emitter of claim 13, wherein said complementary interlocking features are configured such that said thermoset elastomeric component is mechanically retained against disengagement from said relatively rigid polymer component in any direction.

17. The drip emitter of claim 13, wherein said thermoset elastomeric component includes a sealing margin deployed to seal against the inner surface of the irrigation hose and defining said drip outlet.

18. The drip emitter of claim 13, further comprising
E) a hose interface including contact surfaces for interacting with the inner surface of the wall of the irrigation hose, said hose interface further including:
  i) a frame formed by said relatively rigid polymer component extending around said thermoset elastomeric component on at least three sides, and
  ii) a margin provided by said thermoset elastomeric component for abutting the inner surface of the wall of the irrigation hose so as to delimit the variable geometry flow restriction.

19. The drip emitter of claim 18, wherein said frame projects beyond said margin such that, when said frame is welded to the inner surface of the wall of the irrigation hose, said frame penetrates into the wall of the irrigation hose to a greater degree than said margin.

20. The drip emitter of claim 13, wherein said variable geometry flow restriction is implemented as a labyrinth.

21. The drip emitter of claim 20, wherein at least part of said labyrinth comprises a sequence of baffles and a base, said sequence of baffles and said base being integrally formed as part of said thermoset elastomeric component.

22. The drip emitter of claim 21, wherein said thermoset elastomeric component further comprises a plurality of under-tooth bypass spaces passing between said base and said sequence of baffles, and wherein said base is exposed to the fluid pressure within the irrigation hose such that increased fluid pressure within the irrigation hose causes progressive closing of said plurality of under-tooth bypass spaces, thereby regulating said flow rate through the drip emitter.

23. A method of manufacturing a drip emitter, the drip emitter including two components, a relatively rigid frame component and an elastomeric flow control component, the two components molded as a unitary structure, the method comprising:
  A) initially positioning a movable divider to partition a hollow of a mold into at least two cavities including an inner cavity for forming the elastomeric flow control component and an outer cavity for forming the relatively rigid frame;
  B) injecting a first material into a first of said at least two cavities to form a first of the two components;
  C) reconfiguring said mold by repositioning said movable divider to open an interface between said first cavity and a second cavity of said at least two cavities, and
  D) injecting a second material into said second cavity to form a single integral structure including said first material and said second material.

24. The method of claim 23, wherein said first cavity is said outer cavity and said second cavity is said inner cavity and said second material is an elastomeric polymer.

25. The method of claim 23, wherein said first material is an elastomeric polymer and said first cavity is said inner cavity and said second cavity is said outer cavity.

26. The method of claim 23, wherein said mold includes a first section and a second section and wherein said second section includes said first cavity and said second cavity, and wherein said first section includes an undercut for forming at least one baffle and a projection for forming a bypass space.

27. The method of claim 26, wherein said undercut is configured to communicate with said hollow and said projection intervenes between a portion of said undercut and said hollow.

28. The method of claim 26, wherein said undercut is in communication with said inner cavity during said forming of said at least one baffle.

29. The method of claim 26, further comprising:
  E) stripping said at least one baffle from said undercut by elastic deformation of said at least one baffle.

30. A drip emitter for attachment to an inner surface of a wall of an irrigation hose, comprising:
  a) a water inlet for receiving water from the irrigation hose;
  b) a drip outlet for releasing water through an opening in the wall of the irrigation hose;
  c) a fluid flow pathway from said water inlet to said drip outlet, said fluid flow pathway including a labyrinth flow restriction, at least part of said labyrinth flow restriction being formed in a one piece elastomeric component, said one piece elastomeric component including:
    i) a sequence of elastomeric baffles,
    ii) an elastomeric base underlying said sequence of elastomeric baffles, and
    iii) a plurality of under-tooth bypass spaces located between said elastomeric base and said sequence of elastomeric baffles, and
wherein said one piece elastomeric component is configured such that, when the drip emitter is attached to the inner surface of the irrigation hose, said elastomeric base is responsive to increasing fluid pressure within the irrigation hose to progressively contact more baffles of said sequence of elastomeric baffles, thereby progressively closing respective bypass spaces of said plurality of under-tooth bypass spaces, thereby regulating a flow rate through the drip emitter;
wherein the drip emitter is produced by the method of claim 23.

31. A drip emitter for attachment to an inner surface of a wall of an irrigation hose around less than half of the periphery of the irrigation hose, the drip emitter comprising:
  a) a thermoset elastomeric component surrounded on at least three sides by a relatively rigid polymer component;

b) a water inlet for receiving water from the irrigation hose;
c) a drip outlet for releasing water through an opening in the wall of the irrigation hose; and
d) a fluid flow pathway from said water inlet to said drip outlet, said fluid flow pathway including a flow restriction, said flow restriction being a variable geometry flow restriction formed by said thermoset elastomeric component, and wherein said thermoset elastomeric component and said relatively rigid polymer component are formed by bi-component injection molding, and wherein said thermoset elastomeric component is configured such that, when the drip emitter is attached to the inner surface of the irrigation hose, said thermoset elastomeric component is responsive to a change in a fluid pressure within the irrigation hose to modify a geometry of said variable geometry flow restriction so as to regulate a flow rate through the drip emitter, and wherein said thermoset elastomeric component and said relatively rigid polymer component are formed with complementary interlocking features such that, when the drip emitter is attached to the inner surface of the irrigation hose, said thermoset elastomeric component is mechanically retained in engagement with said relatively rigid polymer component; wherein the drip emitter is produced by the method of claim 23.

* * * * *